United States Patent
Olson et al.

(10) Patent No.: US 8,595,294 B2
(45) Date of Patent: Nov. 26, 2013

(54) SYSTEM FOR DIGITAL YEARBOOK WITH ADVERTISING

(71) Applicant: Wolf Pack Products, LLC, North Sioux City, SD (US)

(72) Inventors: Anthony M. Olson, Dakota Dunes, SD (US); Jennifer Kay Winquist, Jefferson, SD (US); Joseph G. Richard, Dakota Dunes, SD (US); Frank Liebenow, Treasure Island, FL (US)

(73) Assignee: Wolf Pack Products, LLC, North Sioux City, SD (US)

( * ) Notice: Subject to any disclaimer, the term of this patent is extended or adjusted under 35 U.S.C. 154(b) by 0 days.

(21) Appl. No.: 13/723,846

(22) Filed: Dec. 21, 2012

(65) Prior Publication Data

US 2013/0103506 A1    Apr. 25, 2013

Related U.S. Application Data

(63) Continuation-in-part of application No. 13/537,599, filed on Jun. 29, 2012, now Pat. No. 8,364,755, which is a continuation of application No. 12/560,226, filed on Sep. 15, 2009, now Pat. No. 8,244,801.

(60) Provisional application No. 61/096,872, filed on Sep. 15, 2008.

(51) Int. Cl.
*G06F 15/16* (2006.01)
*G06F 17/00* (2006.01)
*G06F 3/00* (2006.01)

(52) U.S. Cl.
USPC ........... 709/203; 709/205; 709/229; 715/200; 715/700

(58) Field of Classification Search
USPC ......................................................... 709/203
See application file for complete search history.

(56) References Cited

U.S. PATENT DOCUMENTS

| | | | | |
|---|---|---|---|---|
| 5,845,273 A | * | 12/1998 | Jindal | .................................. 1/1 |
| 5,900,876 A | | 5/1999 | Yagita et al. | |
| 6,493,734 B1 | | 12/2002 | Sachs et al. | |
| 6,839,878 B1 | | 1/2005 | Icken et al. | |
| 6,859,909 B1 | | 2/2005 | Lerner et al. | |
| 6,920,605 B1 | * | 7/2005 | Challenger et al. | ........... 715/209 |

(Continued)

FOREIGN PATENT DOCUMENTS

| | | |
|---|---|---|
| AU | 2004100316 A4 | 4/2004 |
| JP | 11031141 A | 2/1999 |

(Continued)

OTHER PUBLICATIONS

Wilson, Digital personalized yearbooks, RD 477072 Kenneth Mason Publications Ltd, Jan. 2004.*

(Continued)

*Primary Examiner* — David Lazaro
*Assistant Examiner* — Robert Shaw
(74) *Attorney, Agent, or Firm* — Frank Liebenow

(57) ABSTRACT

A customized digital yearbook system includes advertisements that are inserted into each of the individual customized yearbooks. Preferably, a fee is paid by the advertisers for keeping the advertisements in the individual customized yearbooks for a period of time, which is renewable. If not renewed, in some embodiments, a new advertiser pays a fee and the advertisements are replaced with new advertisements from the new advertiser(s).

15 Claims, 30 Drawing Sheets

(56) References Cited

U.S. PATENT DOCUMENTS

| | | | |
|---|---|---|---|
| 7,020,654 B1 | 3/2006 | Najmi | |
| 7,143,357 B1* | 11/2006 | Snibbe et al. | 715/751 |
| 7,321,919 B2* | 1/2008 | Jacobs et al. | 709/205 |
| 7,689,909 B1 | 3/2010 | Szuszczewicz | |
| 7,917,853 B2 | 3/2011 | Trauth | |
| 2002/0035697 A1* | 3/2002 | McCurdy et al. | 713/200 |
| 2002/0091584 A1 | 7/2002 | Clark et al. | |
| 2002/0152215 A1 | 10/2002 | Clark et al. | |
| 2002/0184189 A1 | 12/2002 | Hay et al. | |
| 2003/0163784 A1* | 8/2003 | Daniel et al. | 715/514 |
| 2003/0226101 A1* | 12/2003 | Glover | 715/500.1 |
| 2004/0088420 A1 | 5/2004 | Allen et al. | |
| 2004/0145603 A1* | 7/2004 | Soares | 345/730 |
| 2004/0162760 A1* | 8/2004 | Seet et al. | 705/14 |
| 2004/0217884 A1 | 11/2004 | Samadani et al. | |
| 2005/0081159 A1 | 4/2005 | Gupta et al. | |
| 2005/0125725 A1* | 6/2005 | Gatt | 715/517 |
| 2005/0193015 A1 | 9/2005 | Logston et al. | |
| 2005/0209999 A1 | 9/2005 | Jou | |
| 2005/0216300 A1 | 9/2005 | Appelman et al. | |
| 2005/0234864 A1 | 10/2005 | Shapiro | |
| 2005/0261990 A1 | 11/2005 | Gocht et al. | |
| 2005/0278629 A1* | 12/2005 | Chailleux | 715/704 |
| 2005/0289461 A1* | 12/2005 | Amado et al. | 715/530 |
| 2006/0010073 A1 | 1/2006 | Fisher et al. | |
| 2006/0129924 A1 | 6/2006 | Nelson et al. | |
| 2006/0271691 A1 | 11/2006 | Jacobs et al. | |
| 2007/0011607 A1 | 1/2007 | Lazareck et al. | |
| 2007/0061487 A1 | 3/2007 | Moore et al. | |
| 2007/0079001 A1 | 4/2007 | Ando et al. | |
| 2007/0088608 A1* | 4/2007 | Fogelson | 705/14 |
| 2007/0098364 A1 | 5/2007 | Toennis et al. | 386/95 |
| 2007/0130509 A1* | 6/2007 | Gombert et al. | 715/513 |
| 2007/0233562 A1* | 10/2007 | Lidwell et al. | 705/14 |
| 2008/0010319 A1* | 1/2008 | Vonarburg et al. | 707/104.1 |
| 2008/0077595 A1 | 3/2008 | Leebow | |
| 2008/0097957 A1 | 4/2008 | Hoover et al. | |
| 2008/0133658 A1 | 6/2008 | Pennington | |
| 2008/0140837 A1 | 6/2008 | Hoover et al. | |
| 2008/0141108 A1 | 6/2008 | Matsuura | |
| 2008/0184127 A1* | 7/2008 | Rafey et al. | 715/736 |
| 2008/0209533 A1 | 8/2008 | Abrams et al. | |
| 2008/0215615 A1* | 9/2008 | Hoover et al. | 707/103 R |
| 2008/0215967 A1* | 9/2008 | Abrams et al. | 715/255 |
| 2008/0215985 A1* | 9/2008 | Batchelder et al. | 715/731 |
| 2008/0243828 A1 | 10/2008 | Reztlaff et al. | |
| 2008/0267091 A1* | 10/2008 | Parkkinen et al. | 370/255 |
| 2008/0270470 A1* | 10/2008 | Buck et al. | 707/104.1 |
| 2008/0270615 A1 | 10/2008 | Centola et al. | |
| 2008/0306823 A1* | 12/2008 | Doran et al. | 705/14 |
| 2009/0070426 A1* | 3/2009 | McCauley et al. | 709/205 |
| 2009/0076893 A1* | 3/2009 | Castineiras | 705/14 |
| 2009/0089385 A1 | 4/2009 | Du | |
| 2009/0119590 A1 | 5/2009 | Kondziela et al. | |
| 2009/0197234 A1* | 8/2009 | Creamer et al. | 434/350 |
| 2009/0327850 A1 | 12/2009 | Obrecht et al. | |

FOREIGN PATENT DOCUMENTS

| | | | |
|---|---|---|---|
| JP | 2002042145 A | 2/2002 | |
| JP | 2004139517 A | 5/2004 | |
| JP | 2005182723 A | 7/2005 | |

OTHER PUBLICATIONS

YearbookInteractive (YBI) . Nov. 17, 2006.*
S. Wilson, Digital personalized yearbooks, Research Disclosure database No. 477072, Kenneth Mason Publications Ltd, Jan. 2004.
YearbookInteractive (YBI), Nov. 17, 2006 http://web.archive.org/web/2006111 714 1225/http://www.yearbookinteractive.com/lifetouch/index.html (downloaded Sep. 12, 2011).
YearbookAiive Creator, Itamar Multimedia, 2005.

* cited by examiner mysocialnet - Customize My Yearbook  — 1352

If you have a nickname, enter it here: [Enter nickname]

Group/team membership (select all that apply):
- ⊙ Football   ⊙ Chess Club   ← 1354
- ○ Basketball   ○ Glee Club
- ○ Swimming   ○ Debate Club
- ⊙ Track   ○ Dance Club
- ○ Baseball   ⊙ Band Do you want to include a "friends" page?  ⊙ Yes   ○ No  ← 1356
Do you want to opt-out of advertisements?  ○ Yes   ⊙ No  ← 1358
Do you want a printed copy?  ○ Yes   ⊙ No  ← 1360

[SAVE] — 1362   [CAN] — 1364

SYSTEM FOR DIGITAL YEARBOOK WITH ADVERTISING

CROSS REFERENCE TO RELATED APPLICATIONS

This application is a continuation-in-part of U.S. application titled "SYSTEM FOR DIGITAL YEARBOOK WITH SOCIAL NETWORKING," Ser. No. 13/537,599, filed Jul. 5, 2012; which is a continuation of U.S. Pat. No. 8,244,801 titled "SYSTEM FOR DIGITAL YEARBOOK DELIVERY WITH MULTI-MEDIA DATA". This application is related to U.S. Pat. No. 8,214,436 titled, "SYSTEM FOR CUSTOMIZED DIGITAL YEARBOOK DELIVERY," issued Jul. 13, 2012. This application is also related to U.S. Pat. No. 8,214,426 titled, "SYSTEM FOR INDIVIDUALLY CUSTOMIZED DIGITAL YEARBOOK DELIVERY," issued Jul. 3, 2012.

FIELD OF THE INVENTION

This invention relates to the field of publishing and more particularly to a system for integrating delivery of yearbook content with multimedia data with social networking.

BACKGROUND

The present invention relates to the delivery of yearbook content. Yearbooks are, generally, collections of related photographs, images, descriptions, writings and, now, video, often commemorating school activities and accomplishments. Often such are related to a particular class, military group, or other group of people such as a high school graduating class or a corporate division or department. Yearbooks provide memories to students long after they graduate and a method of finding or remembering people in organizations as they grow and shrink.

Originally, yearbooks consisted of a published book of photographic images and text. Each student had their class picture taken early in the year and the book is published, printed and distributed, hopefully well in advance of graduation so students were able to obtain signatures, notes, etc., of their closest friends. Although this form of yearbook worked for many years, it does have its drawbacks. First, due to publishing turnaround time, it required all content to be ready well in advance of graduation and therefore did not contain content from the last half of the graduating year. Second, it is very difficult to make changes after printing unless overlay stickers are provided. Third, it is expensive to produce and print books and, fourth, the book itself consumes natural resources to produce including paper, ink, etc.

With current technology, the publishing process of a yearbook has been dramatically improved with software tools designed for content creation and formatting, digital cameras and advanced printing presses. This expedites the creation of a yearbook, but the end user is still left with a paper book of flat images. Whatever content was created early in the graduating year is digitized, edited, organized and, once finished, used to publish the printed yearbooks. There were no provisions for individuality. No provisions for one student to annotate another student's yearbook and no provisions for making the digital yearbook resemble the paper yearbook that users are accustom to seeing.

Recently, with the proliferation of digital content consumption devices such as home computers, digital books, digital televisions, tablet computers, smart phones, and home media players provide new avenues for digital publishing and consumption of digital content. The resolutions of high-definition televisions and computers are certainly sufficient for reproducing page-like photographic images and high-quality text. These new consumption tools provide for new modalities of consumption. Now contents can be viewed at the one foot level on a phone while on the go, or at the ten foot level socially with a team.

The current art provides yearbook functionality that provides flat data to the user such as images and text, but fails to integrate video, animation and sound. In such, each user is provided with the same yearbook as the next even though some users are not interested in some yearbook information in which other users are interested.

What is needed is a system for creation and delivery of custom yearbook content which includes advertisements that provides for the advertisements to be updated at future dates.

SUMMARY

The present invention provides, among other things, an improved electronic yearbook including features previously provided by traditional paper, bound yearbooks along with additional features not possible in paper format. Users have features to enable customized views of their own personal yearbook as well a variety of delivery modes for a wide range of output devices such as computers, cell phones, personal digital assistants, tablet computers, televisions, and home theatre systems. Being digital, the yearbook lives well beyond the date of publishing through, for example, updates, web based social networks, media distributions, etc. Likewise, alternate content is anticipated that enhances the yearbook experience, delivered with the yearbook or as auxiliary links. Alternate content examples are current music, current video, current news headlines, advertisements, etc. In some embodiments, the system combines these sophisticated yearbook features with social networking features to provide attractive user features long after, for example, graduation. In such, users from, for example, a high school will tend to remain users of the system long after graduation, taking advantage of the social networking features to stay in touch with some or all of the user's graduating class, club associations, sports team associations, or class associations.

Funding of many yearbooks is provided by the sale of the yearbooks as well as by advertisers or sponsors. For example, schools often (in the past) print a list of sponsors on a sponsor page of the yearbook. If anyone older than 40 looks at their high school yearbook, they will find that some or all of these sponsors are out of business. The customized yearbook creates greater funding opportunities, not only by appealing to a greater percentage of potential buyers and even other family members (e.g., grandparents, etc.), the customized yearbook provides enhanced advertising opportunities. Being digital, the customized yearbook includes facilities for images, video, and audio advertisements, each providing a potential revenue stream to fund the institution. Furthermore, in some embodiments, it is anticipated that revenue is generated for periods of time, so that, advertisers will either continue to pay for renewal of advertisements or the institution is free to solicit replacement advertisements, possibly for goods and services that relate more to the current general age of the customized yearbook recipients. For example, when the members of the graduating class approach 25 years of age, advertisements for disposable diapers might be appropriate but later when they approach 55 years of age, advertisements for places to retire might be more appropriate.

In some embodiments of the customized digital yearbook system, advertisements are inserted into each of the individual customized yearbooks. In some embodiments, a fee is paid by the advertisers for keeping the advertisements in the individual customized yearbooks for a period of time, which is renewable. If not renewed, in some embodiments, a new advertiser pays a fee and the advertisements are replaced with new advertisements from the new advertiser(s).

In one embodiment, a system for providing a customized digital yearbook is disclosed. The system includes a server and a user device for presenting media content on a display of the user device. Yearbook software running on the server receives yearbook data through the network and stores the yearbook data as unapproved content. Once unapproved content is approved, the yearbook software extracts the approved yearbook data from the unapproved content and stores the approved yearbook data as approved content, the approved yearbook data being a subset of the yearbook data that is approved for distribution in the customized digital yearbook. The yearbook software merges the approved yearbook data with external content and delivers the approved yearbook data and the external content in a customized digital yearbook for a particular user. The customized digital yearbook is accessed by the user device.

In another embodiment, a method for providing a customized digital yearbook is disclosed. The method includes collecting fees for an advertisement that is stored in digital form in a database and capturing yearbook content for a yearbook into the database. The yearbook content is edited and organized within the database. Approved yearbook content is determined; generally the approved content is a subset of the yearbook content that is approved for distribution by, for example, a yearbook administrator. A customized digital yearbook pertaining to a user is created. The customized digital yearbook includes any or all of the approved yearbook content and the advertisement. The customized digital yearbook including the advertisement is accessed by user devices.

In another embodiment, a method for providing a customized digital yearbook is performed by a computer having computer-executable instructions stored on non-transitory computer-readable media. The non-transitory computer-readable media is interfaced to a computer which executes the computer-executable instructions to implement the method comprising the steps of: capturing content for a yearbook and storing the content in a database. Editing and organizing the content within the database and extracting approved content from the content. The approved content is a subset of the content that is approved for distribution (e.g. by an administrator). An advertisement (or multiple advertisements) is stored in the database. A customized digital yearbook for a particular user is created including some or all of the approved content and also including the advertisement(s). The customized digital yearbook is delivered to a device associated with the particular user (e.g. accessed over a network, through a social network, or delivered on a digital medium).

BRIEF DESCRIPTION OF THE DRAWINGS

The invention can be best understood by those having ordinary skill in the art by reference to the following detailed description when considered in conjunction with the accompanying drawings in which:

FIGS. 19-23 illustrate exemplary social network and yearbook user interfaces.

DETAILED DESCRIPTION

Figure 1:
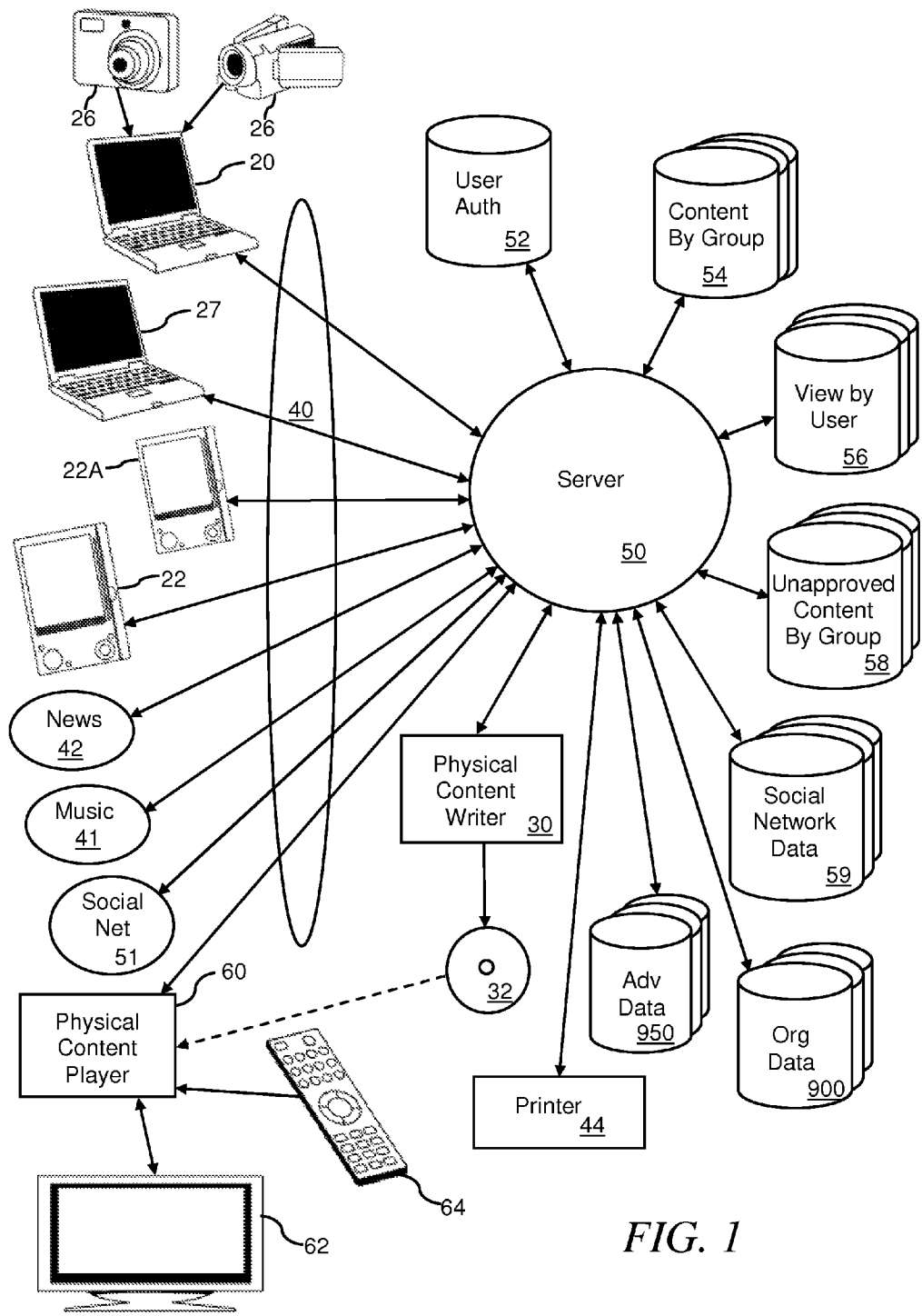
FIG. 1 illustrates a system view of a digital yearbook system.

Reference will now be made in detail to the presently preferred embodiments of the invention, examples of which are illustrated in the accompanying drawings. Throughout the following detailed description, the same reference numerals refer to the same elements in all figures.

Throughout this description, the term yearbook refers to a publication, whether in paper or electronic form. This publication typically includes information and images of members of an organization at a certain point in time. The best example of such is a high school yearbook which typically includes pictures/images of each student, picture/images of the school and activities and various writings. The present invention further includes other forms of content not available with a paper yearbook such as video segments, music, current events, audio segments (e.g., voice signatures), etc. Furthermore, because of the electronic nature of the data, the concept of "publishing" changes to more of a continuum, in that, for example, a yearbook committee has the ability to assemble and approve a vast amount of data (pictures, video, audio, text, etc.) then, from that data, suggest a certain subset in a certain order and a certain format for the yearbook to be "published" on a certain date (e.g. a few weeks before graduation). The community (e.g. students) then has the ability to include what is of interest to them and exclude what is of little interest, forming personal yearbooks. From this, the individual has the ability to include content that didn't make the final cut (e.g., highlights from a football game in which they were the star). Furthermore, the committee is capable of living on throughout future years, releasing or "publishing" updated yearbooks, approving changes to existing content, deleting objectionable content, selling/updating advertisements, sell-through of content, including content that didn't make the final cut, etc.

It is fully anticipated that a revenue stream is possible from yearbook updates, either from the custom yearbook recipients (e.g. graduates) in the form of: a nominal maintenance fee (e.g. the recipient pays a few dollars per year to receive updates), in the form of payments to make updates (e.g. recipients or others pay to update or redact certain information), and/or in the form of payments to include advertisements on the published (or pre-published) yearbooks.

Throughout this description, the term "group" refers to a set of people such as a graduating class (e.g., class of 2025) along with other significant individuals such as teachers, aides and administrators. Another example of such a group is a corporate entity such as an entire company, division, department, etc.

Throughout this description, the term cellular phone is used for any phone that operates without a direct wire connection to a phone system by any wireless connection including all forms of cellular communication, all forms of satellite communication, etc.

Throughout this description, the term personal computer indicates any computer device having a user interface for operation by a person.

Referring to FIG. 1, a system view of an exemplary digital yearbook system of the present invention is shown. Other architectures are anticipated and work equally well to deliver the yearbook system of the present invention. In this example, a server 50 is central to the digital yearbook system, either a dedicated server 50 or a "cloud" environment (e.g. running on some set of computing elements). The server 50 has access to data storage systems 52/54/56/58/59/900 (e.g., file systems or databases). In the system shown, the server has a user authentication file 52, a file for storing content by group 54, a file for storing views by user 56, a file for storing unapproved content by group 58 and a file for storing social network data 59. Other organizations of data in different configurations of files are anticipated.

Any number of content creators 20 is connected to the server 50. In this example, one or more cameras 26 (e.g. digital still camera or video camera) are interfaced with the content creator 20 for capturing and uploading images or video. Each content creator 20 locally authors content using available image, text and/or video manipulation tools. Once the image, text and/or video is ready to be included in the yearbook, the image, text and/or video is uploaded to the server 50 and is stored in the unapproved content by group file 58 for the given group. Uploading the content is authorized by the server 50 using the user authentication file 52. With the proliferation of digital cameras and digital video cameras, in some embodiments, it is anticipated that many or all members of the organization are authorized to upload (e.g. submit) content for review and possible inclusion in the approved content 54.

It is also anticipated that some members will have content that is of interest only to that member such as a picture of a family pet, etc. In such, it is anticipated that there are directives for the user to initiate that will include local, private content, into that member's customized yearbook.

In summary there are at least three categories of yearbook data: unapproved content that has been uploaded but not approved for distribution, approved content that is approved for inclusion into one or more versions of the customizable yearbook, and included content that is approved for inclusion into one or more versions of the customizable yearbook and is actually in one or more published versions of the yearbook. Again, published is more of a term that signifies finalization since printing is optional.

At a later time, an editor with responsibility for screening inappropriate content accesses the server, in some embodiments from a different terminal device 27, and reviews any new content that is stored in the unapproved content by group file 58 and, if approved, that content is transferred into the content by group file 54.

As one or more individuals (e.g. yearbook committee) assemble a version of the yearbook, a subset of the approved content that is included in the yearbook becomes "included content." It is anticipated that, long after the event (e.g. graduation), the approved content is maintained (e.g. in the server or cloud) and is available for individual access or, in some embodiments, is available for a fee (e.g., you can browse through the videos of all 40 football games in which you played at a fee per hour or a one-time access fee, etc.).

The file for storing content by group 54 contains all approved content for each specified group. For example, approved content for a particular high school (e.g., Universal High School or UHS), all approved content is stored in the content by group file 54. In some embodiments, the content for one organization (e.g. school) is kept separate so that it doesn't get mixed-up with content from another organization. In the preferred embodiment, the content by group 54 is sliced or filtered by entries in a view by user file 56. The view by user file 56 contains directives segmented by user and by group, such that, one or more user (e.g., student) is provided a unique view, display, output of the content by group 54, thereby optionally providing custom yearbook view for each user. In some embodiments, multiple users share a single view such that all have/see the same yearbook; for example, a view for the entire football team. In some embodiments, there is a hierarchy of view-by files in which members of a group (e.g. the chess club) have a joint view-by file which customizes the yearbook for each member of the group to include content of interest to that group, and each member of the group has an individual view-by file, further defining what content and what format each particular user will receive in their custom yearbook.

In some embodiments, external content is integrated into the content by group 54 such as music, video, news, advertisements, etc. The external content is provided by various providers such as music providers or music download services 41 and news providers 42 such as local newspapers, etc. Such external content provides yearbook users with a snap-shot of the world during a special timeframe such as the years the user attended high school. This snap-shot includes, for example, popular songs, movies, art, fashion and headlines. In some embodiments, the external content is provided under fair use copyright law such as a limited portion of each song, etc. In some embodiments, complete content is provided such as the complete top-10 songs from each year of high school, etc. In the latter, the content is licensed from the copyright owner (e.g., payment is made) and the users (e.g., students) have an option to include the songs in their yearbook for a fee.

In some embodiments, the custom yearbook recipient purchases the content through, for example, the school or through a third party. In some embodiments, the custom yearbook recipient prescribes to a service that provides the content on demand (e.g. the content is in the cloud and accessible through the custom yearbook).

In some situations, the user (e.g. student) already owns certain content (for example, has already purchased a song through a download service or has purchased the song on a physical media and created a backup copy on their computer system). For such content, in some embodiments, directives are provided to integrate/augment the local content owned by the user along with content from the yearbook system into the users' customized yearbook. For example, if the top ten songs of the graduating year include "Yesterday," and the school offers to include the top ten songs at a cost of $10 and the user already has their own copy of "Yesterday," then the user would only request the remaining nine songs (perhaps at a cost of $9) and provide their own copy of "Yesterday," which is seamlessly integrated into their customized yearbook. In either, the music (or video/movies, etc.) of the time period is coupled to the custom yearbook as a reminder of the days during that era (e.g. high school years).

In some embodiments, the yearbook is accessible through the Network 40 by user devices 22 (e.g. personal computers, smart phones, tablet computers, browser computers, etc.) while production is in progress. In such, the content by group 54 is available through a user interface to a browser on the user device's 22. For example, all currently approved yearbook media for a given group (e.g., "class of 2025") is accessible. In some embodiments of such, the content by group 54 is filtered by one or more views by user 56. In some embodiments, the content by group 54 is available to the user through a social network user interface which provides typical social network features in addition to access to yearbook content 54, again, typically through a browser on the user's device 22 or the like.

Often times, organizations need funding for yearbook or other activities. Sale of specific content such as music, box-office smash hits, etc., is one way for an organization to increase income from yearbook sales. Another way to increase income is anticipated which is to include advertisements in the final yearbook. Advertisements 950 (e.g. video from an advertiser, logos, etc.) are, for example, originally stored in a separate file 950. In some examples, as the advertisements are included in the custom yearbook, one or more advertisements are moved/copied into the content files 54 and appear in areas of the yearbook that cannot be excluded by the view by user files 56. In some embodiments, it is anticipated that users have a facility to "opt-out" of advertisements by paying a fee which, for example, sets a flag or value in the user authentication file 52.

Although it is anticipated that, at publishing of the yearbook, any included advertisements will be directed at the overall population of users, in some embodiments, the advertisements are replaceable over the years. In such, as a high school yearbook example, it is anticipated that when the yearbook is published, the advertisements target the average late teenager, for example, college advertisements, new vehicle advertisements, job placement services, etc. Five years past graduation, such advertisements are not as applicable to the mid-20s individual and it is anticipated that the advertisements be replaced with advertisements directed toward the new demographic, for example, baby products, televisions, housing, etc.

Once the yearbook is complete, there are several ways for a yearbook recipient to obtain/access the yearbook. One delivery mechanism is the traditional printed yearbook. For this delivery method, the content by class 54 is sent to a printer 44. In some embodiments of such, the content sent to the printer is filtered by the views by user 56, thereby providing personalized printed yearbooks for each user (e.g., student).

In some embodiments, when the custom yearbook(s) are ready to publish, print-ready copies are stored for access through the Internet 40 or written to physical content 32 such as removable disks (CD, Blue-ray, etc.), flash media, etc. In this embodiment, each recipient of the print-ready yearbook is free to have their yearbook printed by a printer-of-choice such as traditional book/yearbook printers or a local print shop, etc.

Another delivery mechanism is in physical media 32, such as a compact disk (CD), Digital Video Disk (DVD), Blue Ray Disk, etc. In such, for each user, their formatted content is copied from the content by group file 54 optionally using filters from the view by user file 56 to a physical media 32 by a content writer 30 (e.g., DVD writer). For content filtered by the view by user file 56, each user will have a unique 32 media customized to their preferences. For content that is not filtered by the view by user file 56, each user will have the same physical media 32. Once delivered to the user device 60, the media 32 is inserted/installed into a user device (e.g. content player) 60 designed to present the content from the media 32 on a display (either internal or an external device such as a television 62). Any known user device 60 is anticipated, including, but not limited to, a media player (e.g. DVD, Blue Ray, CD), a computer (e.g. PC), a dedicated disk player (e.g., portable DVD player), a networked video player, an electronic book 22, a cellular phone 142 (see FIG. 8A), etc. In some embodiments, the user device 60 is controlled by a remote control 64.

In some embodiments, the yearbook is accessible through the Network 40 by a controlled or locked user devices 22A (e.g. personal computer with special operating system, e-book, etc.) while production is in progress or after publication. In such, the content by group 54 is available through a user interface peculiar to the user device's 22A. For example, all currently approved yearbook media for a given organization (e.g., "class of 2025") is accessible as a viewable customized yearbook on the user's device. In some embodiments of such, the content by group 54 is filtered by one or more views by user 56. By having control over the device 22A, the organization is provided with enhanced capabilities not available to print-only yearbook systems and further enhanced by locking of the customized yearbook data files such that the user (owner of the device 22A) cannot prevent certain features from working. One such feature is updates. In embodiments in which the customized yearbook is delivered or accessed through an unlocked device 22 (e.g. a personal computer 22), once the user obtains the yearbook, the user is able to make copies and/or defeat certain features such as updates. By using locked devices 22A, the organization (e.g. school) has control over the device 22A and, therefore, control over updates to the customized yearbook. For example, it is anticipated that controls are in place such that the customized yearbook is disabled on the locked device 22A unless periodic communications are established with the server 50 so that updates to the customized yearbook are made. In this way, if the user disables, for example, the wireless interface of the locked device 22A, eventually, the user will no longer have access to their customized yearbook. Likewise, cooperating devices 22 such as smartphones are also anticipated to access the user's customized yearbook, but those devices 22 are anticipated to be setup to access a network copy of the customized yearbook, perhaps with some pages temporarily cached. Therefore, even those devices 22 that are not locked have the ability to be forced to accept updates. In this way, it is almost certain that, when for example a correction is made or an advertisement is changed) all owners of the customized yearbook will be forced to accept such updates.

This also works for many physical content 32 users (e.g. CD/DVD/Blue-ray). In such, the player devices often have network access (personal computers 22, networked content players 60, etc.) and, each time the customized yearbook is accessed, in some embodiments, the player device contacts the server 50 and downloads updates that are overlaid over the physical content 32 or saved in a cache file to overlay those elements when the user views each element. For example, a user receives their customized yearbook on a DVD 32 and the published yearbook includes an advertisement for a college. Ten years later, when the user views their customized yearbook on a networked DVD player 60, the networked DVD player 60 contacts the server 50 and a new advertisement is copied from the server to the networked DVD player 60 (e.g. an advertisement for diapers) and stored in cache. When the user views the page with the advertisement, the new advertisement is shown instead of the old advertisement since the advertiser for the college no longer wants to pay for advertising to 28 year olds. In this way, the organization (school) sells advertisement space long after the members (e.g. students) graduate with reasonable certainty that each time the member views the customized yearbook, the member will view recent advertisements and content.

For embodiments in which the yearbook is delivered to an electronic book 22A or other protected environment such as some restricted operating system devices 22A, the yearbook system is able to capitalize on the protection and communications capabilities of these devices/systems to provide a controlled, yet attractive offering from the organization to the members of the organization. As one anticipated way of doing business, the organization (or third party) provides the user with the device 22A or the user purchases the device 22A, perhaps when they join the organization (e.g. as freshmen). By every user having the device 22A, many other capabilities of the devices are possible, including distribution of assignments, text books, preparation and delivery of homework, tests, etc. During and/or after publication, the same device 22A will receive the user's customized yearbook which will be protected by the device's access system, enhanced by the devices migration system, and updatable through the device's communication system. For example, many electronic book systems keep track of a user's purchases (e.g. in the cloud or on a server) and, should the user migrate to a newer system or should the user's eBook 22A fail, the purchased content is automatically available to the replacement device 22A (either downloaded or accessible through a network/cloud).

As discussed, having a known device 22A or a set of devices for an organization, each having communication capabilities (e.g. Cellular Data access, WiFi, etc.), the organization will have continuous control and access to the distributed yearbooks so that many of the anticipated features are practical or made simpler. For example, by having access and control over everyone's yearbook, when a mistake or wrongful inclusion is discovered years after publishing, the mistake or inclusion is redacted through a change transaction to everyone's customized yearbook. For example, if someone finds a misspelling or a foul word, that can be changed years after graduation. This communication facility will also make it easier to distribute updated images of the organization members so that one can view their friends at graduation, 5 years after, 10 years after, etc. In a similar manner, advertising is updated to match the current demographics of the organization so that, 40 years after graduation, the advertisements for acne medication are replaced with advertisements for arthritis medication. This cannot be done with printed yearbooks.

In all embodiments in which advertisement is present and in which advertisement is replaceable (e.g. the duration of an advertisement is up until a new advertisement is downloaded as a replacement), there are tools for an organization to sell advertising space for many years after the initial publication. How many people who graduated 20 years ago look at their yearbook (paper) and see it was sponsored by the corner grocery store that was torn down 10 years ago? If that sponsor no longer exists, that space is available for other advertisers, providing a continual source of revenue. Throughout this description, advertisements are anticipated to be in any known format including text/image, video segments, and audio (e.g. audio messages, jingles, etc.).

As with web advertising, it is also anticipated that the advertisement space is dynamic. For example, a set of advertisements are included with the published yearbook, updated, or downloaded to the user's device 22. A rectangular advertisement area at the bottom of a page devoted to the football team is allocated for advertisement. Advertisers pay fees to have their advertisement appear in that spot, either exclusively (every time that page is viewed), randomly (with other advertisements), or prioritized (the highest paying advertiser has their advertisements shown more often, etc.). Certain advertiser(s) wish to place content on particular yearbook pages at publication and at future times. For example, at publication, sporting goods advertisers are likely candidates for a football related page, but not for a glee club related page. Ten years later, the target advertiser would be the National Football League, Thirty years later, the target advertisers for the football team would be arthritis medications, knee replacement clinics, etc.

For some user devices 22, it is anticipated that there be mechanisms to detect the success of the advertisements and bill the advertiser accordingly. For example, if the user device supports web browsing and the user selects a particular advertisement, the user device's 22 web browser accesses the advertiser's site and an access is recorded/counted for eventual billing back to the advertiser. If a purchase is made, additional compensation is also anticipated from the advertiser to the organization.

Figure 24:
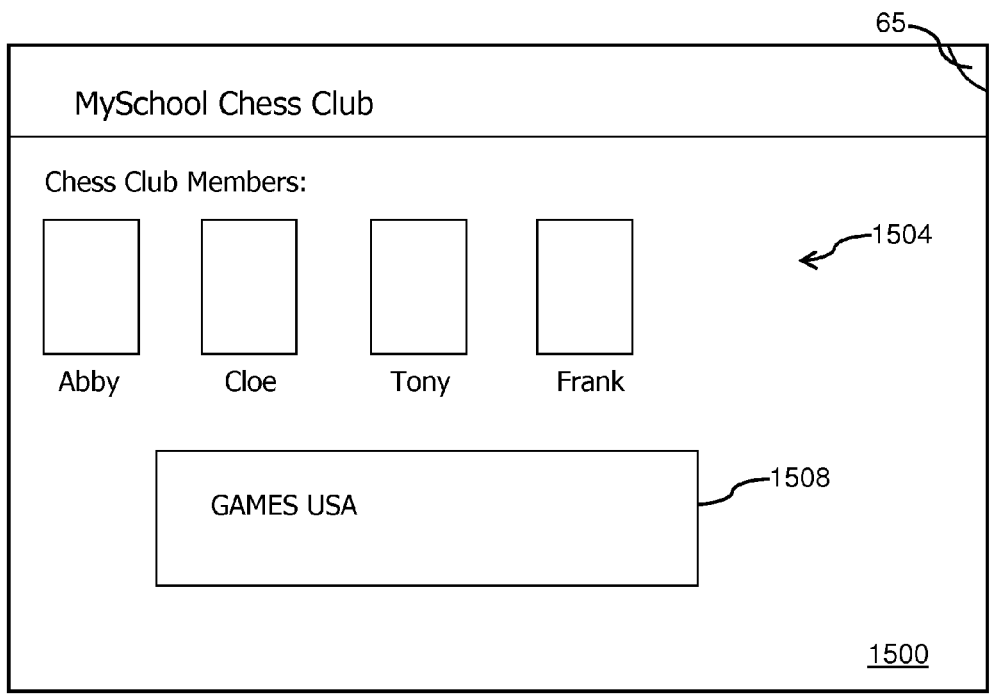
FIGS. 24-24A illustrate exemplary yearbook user interfaces having advertisements.
Figure 24A:
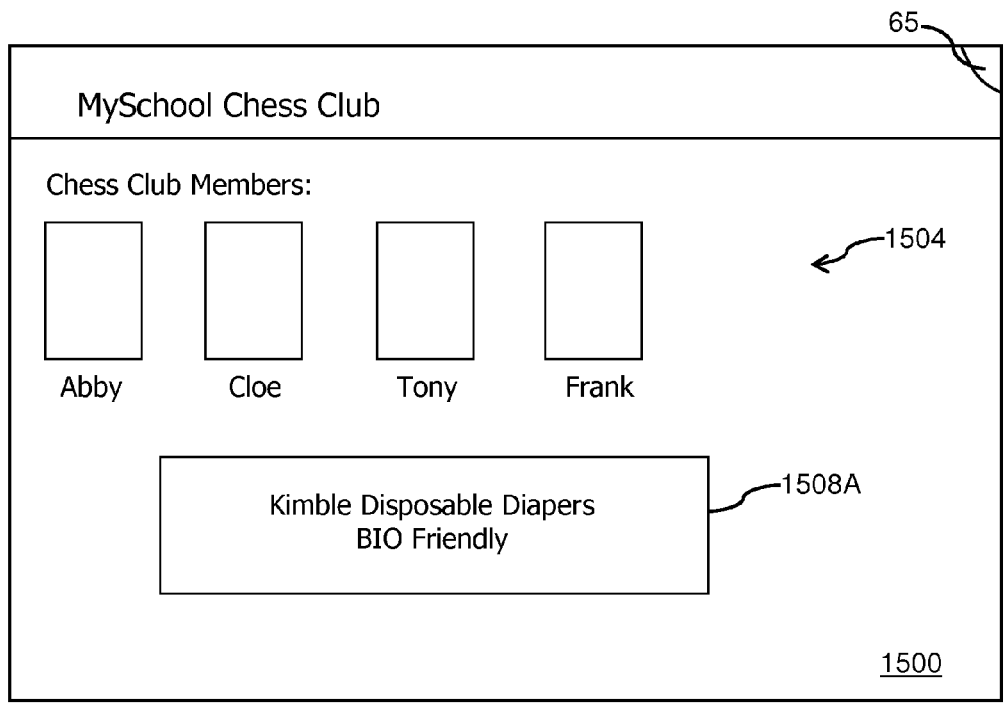

FIGS. 24 and 24A show an example of an advertisement placement 1508/1508A on a customized yearbook page 1500. In both examples, the customized yearbook page 1500 contains some content 1504 such as pictures of the members of the Chess Club. FIG. 24 shows an original advertisement 1508 as was present in the customized yearbook at, for example, graduation (e.g. an advertisement for a store that sells games). Ten years later, for example, the store has gone out of existence and the graduating class has aged 10 years, now interested in other products. FIG. 24A shows the customized yearbook page 1500 after the original advertisement 1508 is replaced by an updated advertisement 1508A, perhaps for a product/company that still exists and for a product/company that is targeting the current age of the customized yearbook owner.

In some embodiments, the user device 60 (content player) has access to the server 50 through the network 40 (e.g., a connected DVD player or a computer). In embodiments in which the user device 60 is connected to the server 50, the content is delivered to the user device 60 either using media 32 (as described above) or by sending the content to the user device 60 over the network 40. Also, in some embodiments when the user device 60 has network access to the server 50, the user is provided with enhanced services such as updates, overlays, current data, controls, updated advertisements, etc. For example, updated photographs of each student are provided from class reunions or a correction is provided that was discovered after the physical media 32 was distributed. In another example, advertisements are updated to match the demographics of the organization years after the yearbook is published.

In some embodiments, the server also supports social network functionality. There are many known social networks such as Facebook. Having social network functionality integrated into a yearbook system as per the present invention provides many features/advantages. For instance, when students graduate from high school, they are automatically members of a social network that is pre-loaded with their classmates. Such helps keep them in touch with other students as well as other new members that subsequently enter the social network. In some embodiments, the social network capabilities are integrated into the present invention by having the server 50 perform all social networking tasks. The user data and histories are stored in a file 59 or database accessible to the server. The file or database 59 contains, for example, social network user data, creative works, uploaded images, voice, user biographies, etc.

With the integration of a customizable yearbook with social networking, many features are anticipated to enhance the social networking capabilities as well as the yearbook capabilities and features. It is known that social networks include the concept of "buddies." Buddies are other members of the social network that are allowed to interact with each other, communicate, and share text, images, video, and audio, etc. In the integrated system of social networking and customized yearbooks, social networking buddies are provided with features/directives that interact with a member's customized yearbook. For example, if a buddy of a member wants to place an audio message saying, "have fun over the summer," on the member's customized yearbook, the buddy uploads the audio to the system and adds the audio to the member's customized yearbook so that, for example, the audio will appear as a "play" icon next to the buddy's picture.

There are many ways anticipated to create buddy lists. The simplest way is for the member to declare which other members are buddies, similar to how existing social networks operate. The social network and customizable yearbook system has access to data through the organization that administers the yearbook such as organization roster, classroom assignments, club membership, team membership, homeroom assignments, department/division (corporate organizations), etc. The social network and customizable yearbook system uses this data to auto-populate the member list with, for example, the entire organization's roster, then establish buddy relationships between selected individuals in the member list based upon a selected set of criteria. For example in an educational environment, all students are added to the member list when they start school. When a student joins a club such as the Chess Club, they are automatically paired as buddies with each other member of the club. In a preferred embodiment, such pairing is an option of the organization administrators. It is also preferred that each member has the ability to "opt-out" of being a buddy of each and/or all other members in the clubs that they join. The automatic buddy affiliation is anticipated for any subset of the organization, including the entire organization. For example, in a corporation, are included as members of the social network. The management of the corporation then decides to make all members of each division, department, or team, automatic buddies with each other member of that division, department, or team.

With the integration of a customizable yearbook with social networking, many features are anticipated to enhance the social networking capabilities as well as the yearbook capabilities and features during the life of the organization and years afterwards. Communications is an important aspect of social networking; Not only buddy-to-buddy communications, but information distribution. Using the organizational data 900 from the yearbook, distribution lists are created with various levels of authorization. For example, members of the Chess Club have authorization to use a distribution list for the Chess Club, thereby enabling communication during the school year(s) such as meeting schedules, changes, club standings, etc. Years after graduation, the same members are enabled to use this distribution list to communicate with the other members. As another example, there is a distribution list for the entire organization, but this one is not authorized for use by the members of the list. Instead, one or more authorized members are allowed access to this list (e.g., the school principal, yearbook editorial staff, etc.). Such a list is useful up to graduation for sending out information such as class schedule changes, school closing information, lunch menus, etc. After graduation, this list is useful for contacting members to inform them of a reunion, to send out alumni information, to solicit donations, to send out periodic newsletters informing all members of changes to the organization's members such as births, deaths, marriages, divorces, relocating, etc.

In some embodiments, the server 50 interfaces with an external social network 51 through the Internet 40. For example, the server connects with an existing service such as Facebook to provide social network access and functions currently/normally available on such social networks.

By interfacing with or integrating social networking, enhanced yearbook features are anticipated. In some embodiments, the social network interface will include features/directives to submit content for the yearbook, to view the yearbook, etc. In some embodiments, the population of the yearbook will automatically be enrolled into the social network, providing a huge number of new social network users for organizations such as high schools, colleges, etc. In some embodiments, buddy networks and/or communications lists are established between members of groups within the organization, between members of the organization, between members of multiple related organizations, etc.

If two people are buddies, then they can view what each other posts on the social network site and communicate freely with each other. Distribution list includes a set of individuals who wish to receive communications. For example, during attendance at a university, all students are included on a university list for sending of common information such as school closings, cafeteria menus, etc. In such, the lists of students is often already present in the schools data system and is transferred into the yearbook/social system into, for example, an organizational data file 900 where the organizational data 900 is used to create user accounts, buddy lists, distribution lists, etc.

Although authorization is dictated by the organization, it is anticipated that this list is accessible only by administrative staff. Again, authorization of each list is dictated by the organization and, some distribution lists are set up so that only the administrator has access (e.g. the chess club organizer has the ability to send to all members). In contrast, some distribution lists are set up so that all members of the distribution lists have access (e.g. all chess club members have the ability to send to all other members). It is also anticipated that each member have the ability to "opt-out" of one, several, or all optional distribution lists and/or buddy lists.

It is anticipated that there are some distribution lists or buddy lists that may span several organizations. For example, several colleges join to create one distribution list and/or buddy list that includes all users associated with football (e.g. coaches, players) from all of those colleges. In this way, one message sent is received by every football player in all of a division or all college teams, etc. Again, it is anticipated that this list have certain access rights and/or the ability to "opt-out." Such hierarchies of distribution lists will enable communications with, for example, every college football player in the country. Practical uses include distribution of rule changes, newsletters, state/country-wide education/advocacy (e.g. don't use performance enhancing drugs), etc.

For yearbook purposes, there are many possible levels of pre-made buddy lists. With the integration of yearbook and social networking, buddy lists become a way to enable "signing" of each other's yearbook. Each user has the ability to "sign" their buddy's yearbook, similar to that buddy handing the user the buddy's printed yearbook and asking for a signature, the combined yearbook/social system provides directive in which the user provides printed text, hand-written text, a short video, an image, audio, etc., which is included with that user's original image in the buddies' customized yearbook. Therefore, when the buddy views their custom yearbook, the user's provided data ("signing") is associated with that user's place in the yearbook. So, for example, if John provides written text saying "do well in college" to Mary, when Mary views her custom yearbook and turns to the page where there appears a picture of John, "do well in college" appears in proximity or over the picture of John, or is viewed by selecting an action such as a "play" icon.

Figure 2:
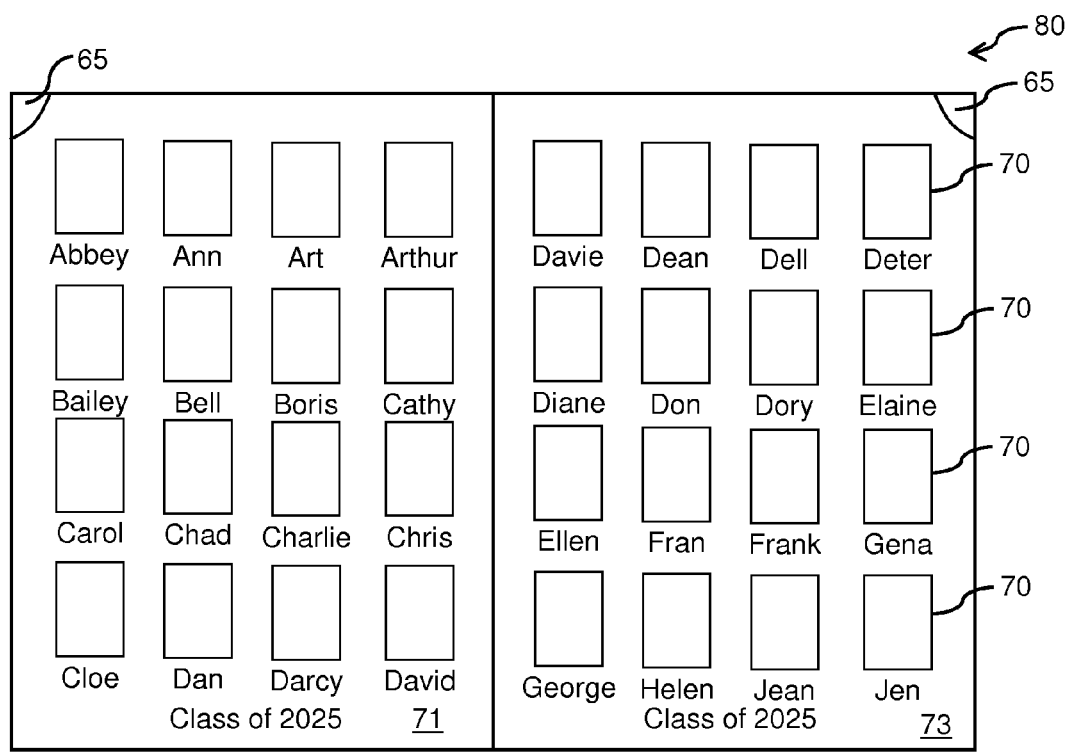
FIG. 2 illustrates a first typical user interface of the present invention showing yearbook pictures.

Referring now to FIG. 2, a first typical user interface of the present invention showing yearbook pictures is shown. In this user interface 80, there are two virtual paper pages 71/73 of photographs 70, similar to a typical printed yearbook. In this example, photographs 70 of a subset of all students are shown, typically in alphabetical order. An icon 65 is provided to page forward/backward. By clicking and holding onto the page turn icons 65 then pulling it right (or left for opposite page), the user will turn the page to the previous (next page). Any user interface is anticipated and the interface shown in FIG. 2 is one example. Note that, in some embodiments and for some output formats, the custom yearbook plays automatically when started, and automatically advancing pages as in a slide show.

Figure 2A:
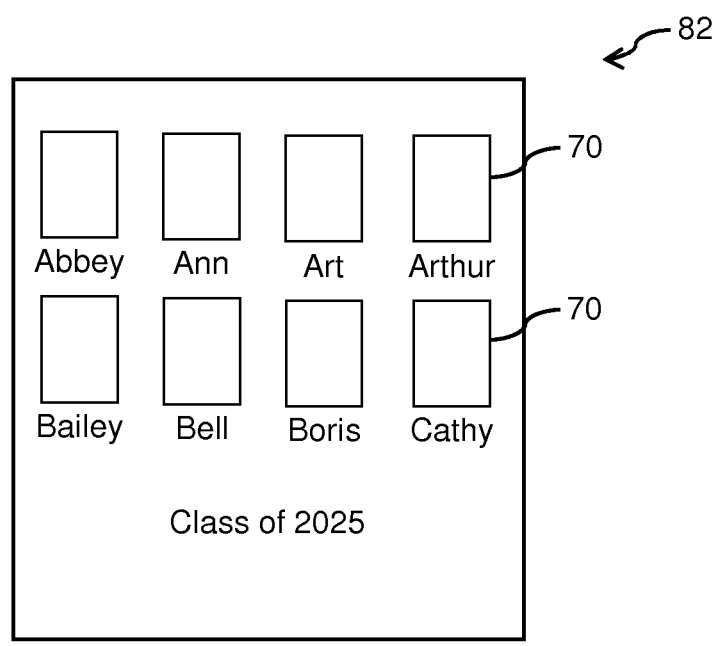
FIG. 2A illustrates a second typical user interface showing yearbook pictures.

Referring now to FIG. 2A, a second typical user interface of the present invention showing yearbook pictures is shown. In this exemplary user interface 82, there is one page of photographs 70, similar to what might be viewed on a limited display device such as a PDA or a personal video player. In this example, some photographs 70 of all of the students are shown. In this example, hard keys such a left and right arrow keys are used to page through the photographs 70. In some embodiments, page numbers are entered to skip directly to a desired page.

Figure 3:
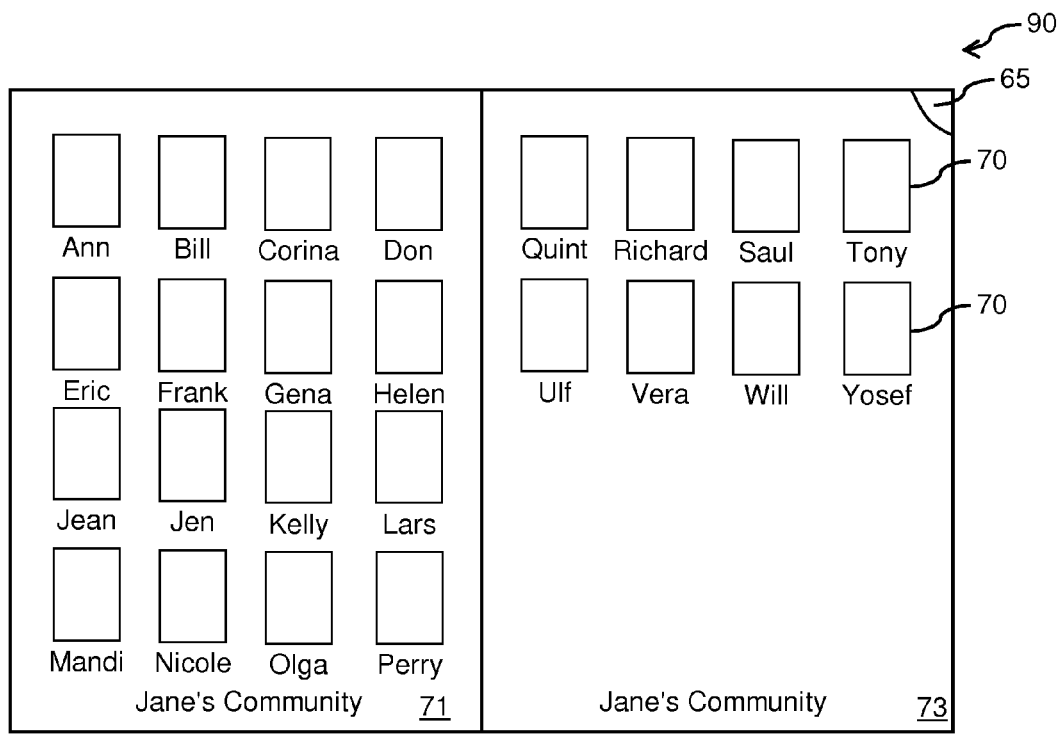
FIG. 3 illustrates the first typical user interface showing yearbook pictures selected by a first user.

Referring now to FIG. 3, the first typical user interface of the present invention showing yearbook pictures selected by a first user is shown. In this user interface 90, there are two virtual paper pages 71/73 of photographs 70, similar to a typical printed yearbook. In this example, photographs 70 of a subset of all students that were selected by a first user (Jane) are shown. This is an example of how a user (Jane) customizes her yearbook by selecting one or more other user's photographs 70 to display them on a "favorites" page. Again, an icon 65 is provided to page forward/backward. By clicking and holding on of the page turn icons 65 then pulling it right (or left for opposite page), the user will turn the page to the previous (next page). Any user interface is anticipated and the interface shown in FIG. 3 is one example.

Figure 3A:
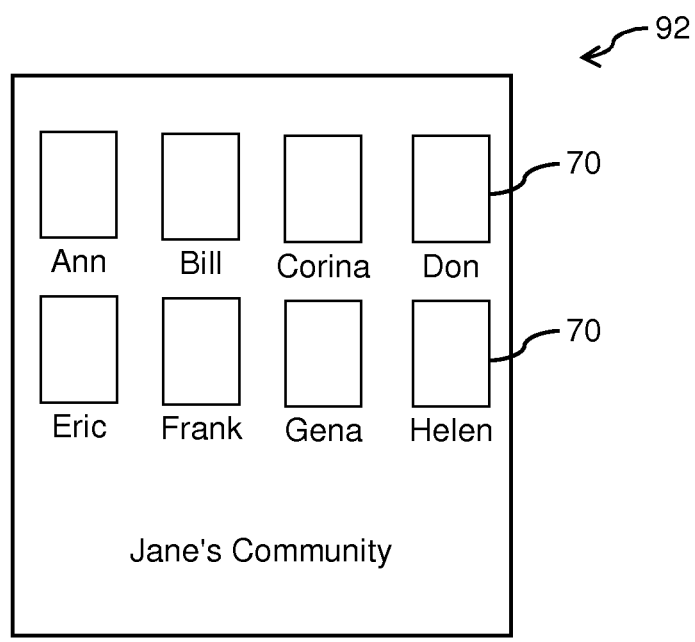
FIG. 3A illustrates the second typical user showing yearbook pictures selected by a first user.

Referring now to FIG. 3A, the second typical user interface of the present invention showing yearbook pictures selected by a first user is shown. In this exemplary user interface 92, there is one page of photographs 70, similar to what might be viewed on a limited display device such as a PDA or a personal video player. In this example, photographs 70 of a subset of all students that were selected by a first user (Jane) are shown. This is an example of how a user (Jane) customizes her yearbook by selecting one or more other user's photographs 70 to display them on a "favorites" page. Paging, in this example, uses hard keys such a left and right arrow keys to page through the photographs 70. In some embodiments, page numbers are entered to skip directly to a desired page.

Figure 4:
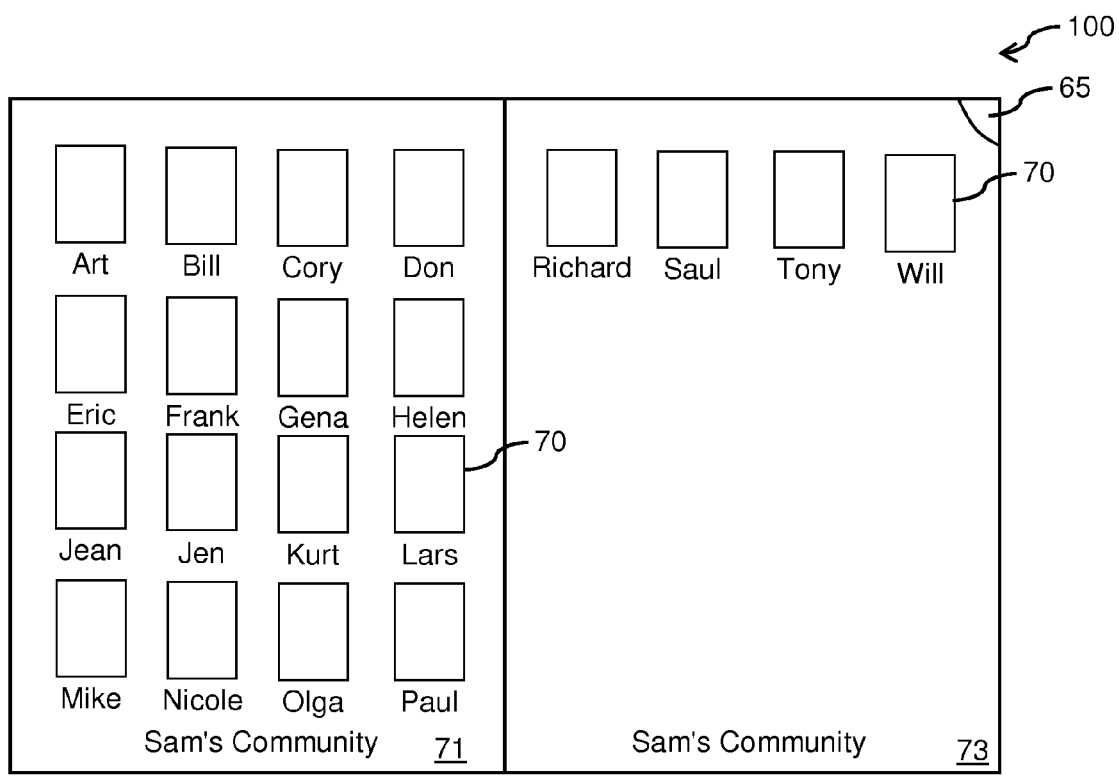
FIG. 4 illustrates the first typical user interface showing yearbook pictures selected by a second user.

Referring now to FIG. 4, the first typical user interface of the present invention showing yearbook pictures selected by a second user is shown. In this user interface 100, there are two virtual paper pages 71/73 of photographs 70, similar to a typical printed yearbook. In this example, photographs 70 of a subset of all students that were selected by a second user (Sam) are shown. This is an example of how a user (Sam) customizes his yearbook by selecting one or more other user's photographs 70 to display them on a "favorites" page. Again, an icon 65 is provided to page forward/backward. By clicking and holding on of the page turn icons 65 then pulling it right (or left for opposite page), the user will turn the page to the previous (next page). Any user interface is anticipated and the interface shown in FIG. 4 is one example.

Figure 4A:
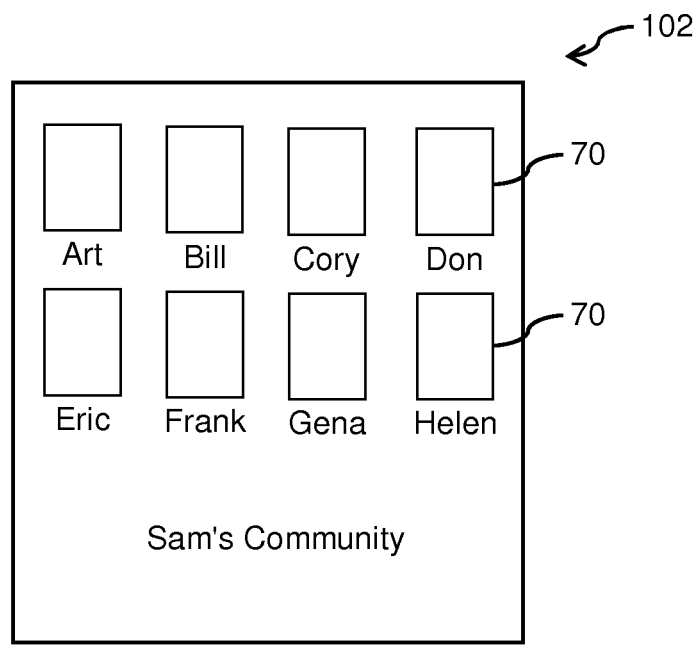
FIG. 4A illustrates the second typical user interface showing yearbook pictures selected by a second user.

Referring now to FIG. 4A, the second typical user interface of the present invention showing yearbook pictures selected by a second user is shown. In this exemplary user interface 102, there is one page of photographs 70, similar to what might be viewed on a limited display device such as a PDA or a personal video player. In this example, photographs 70 of a subset of all students that were selected by a second user (Sam) are shown. This is an example of how a user (Sam) customizes his yearbook by selecting one or more other user's photographs 70 to display them on a "favorites" page. Paging, in this example, uses hard keys such a left and right arrow keys to page through the photographs 70. In some embodiments, page numbers are entered to skip directly to a desired page.

Figure 5:
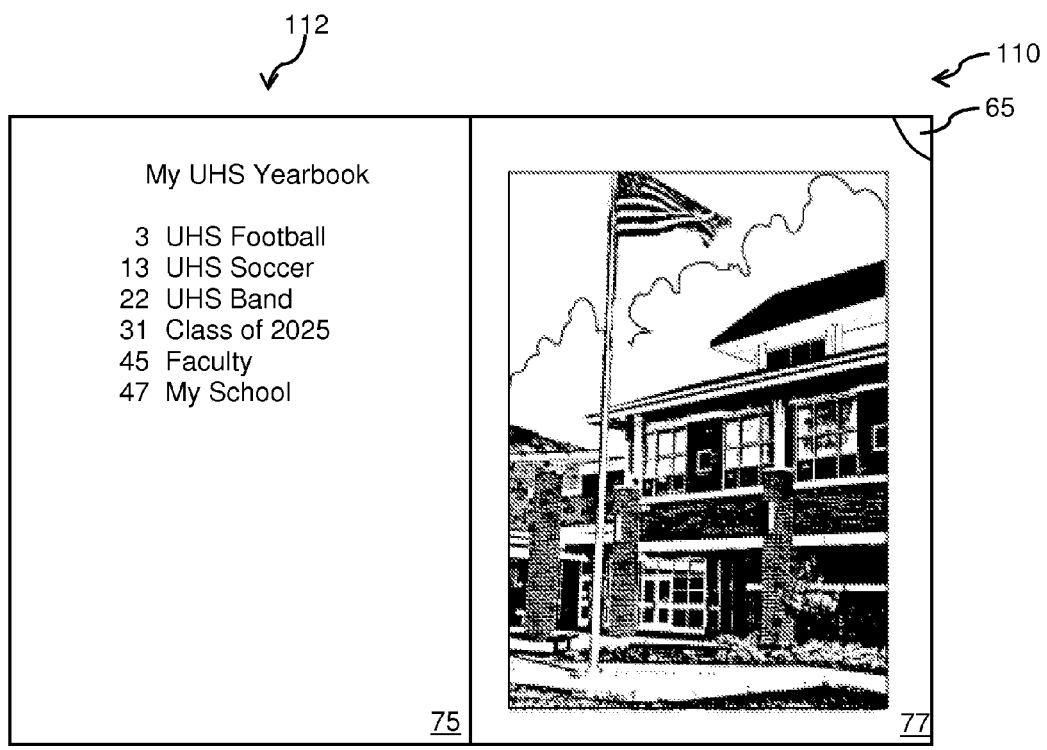
FIG. 5 illustrates the first typical user interface showing a yearbook table of contents.

Referring now to FIG. 5, the first typical user interface of the present invention showing a yearbook table of contents is shown. In this user interface 110, there are two virtual paper pages 75/77, similar to a typical printed yearbook table of contents. In this example, a high school has a format with a table of contents page 75 and a page with a photograph of the front of the high school 77. The table of contents page 75 contains a table of contents 112 similar to that which is in a typical yearbook including sections for Football (page 3), Soccer (page 13), Band (page 22), class photographs (page 31), Faculty (page 45) and photographs of the high school (page 47). Again, an icon 65 is provided to page forward/backward. By clicking and holding on of the page turn icons 65 then pulling it right (or left for opposite page), the user will turn the page to the previous (next page). In some embodiments, clicking on a table of contents entry results in directly addressing the first page of the associated section. Any user interface is anticipated and the interface shown in FIG. 5 is one example.

Figure 6:
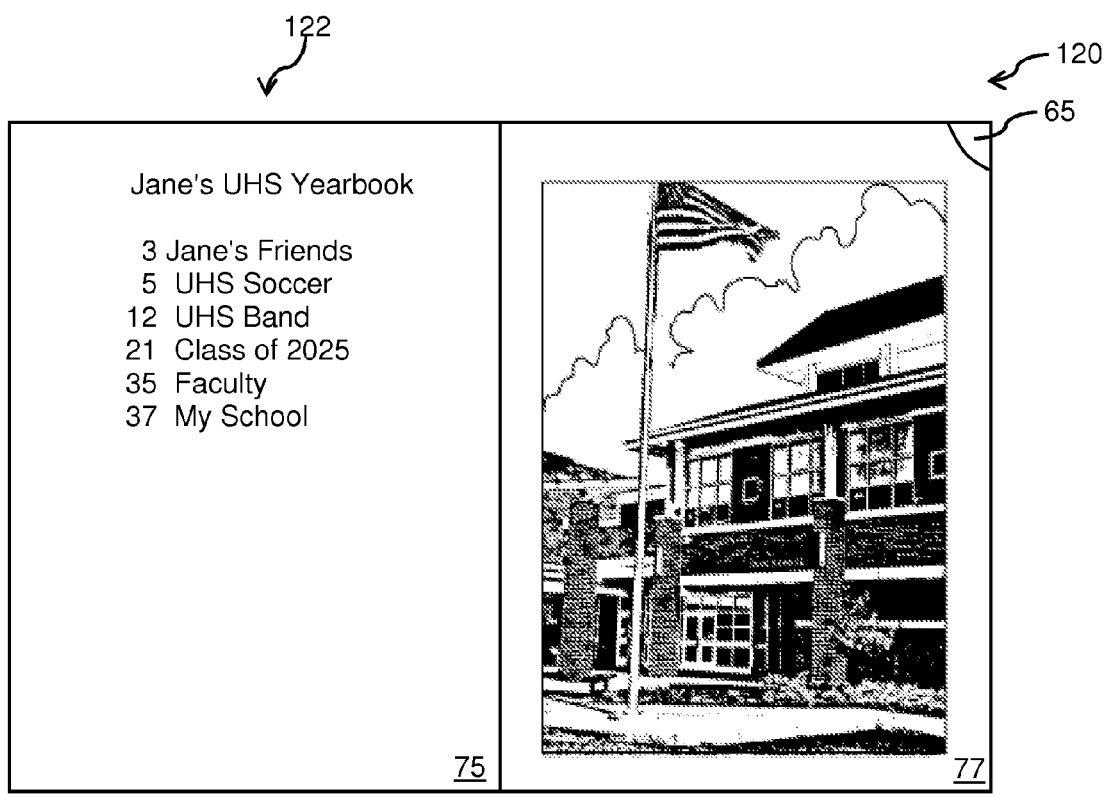
FIG. 6 illustrates the first typical user interface showing a yearbook table of contents customized for the first user.

Referring now to FIG. 6, the first typical user interface of the present invention showing a yearbook table of contents customized for the first user is shown. In this user interface 120, there are two virtual paper pages 75/77, similar to a typical printed yearbook table of contents. In this example, a high school has a format with a table of contents page 75 and a page with a photograph of the front of the high school 77. The table of contents page 75 of this user interface 120 contains a table of contents 122 customized for the first user (Jane) including sections selected by/for Jane: Jane's Friends (page 3), Soccer (page 5), Band (page 12), class photographs (page 21), Faculty (page 35) and photographs of the high school (page 37). In this example, Jane has two custom selected pages of photographs of her friends and she is not involved in Football and has decided not to include the Football section in her yearbook. Again, an icon 65 is provided to page forward/backward. By clicking and holding on of the page turn icons 65 then pulling it right (or left for opposite page), the user will turn the page to the previous (next page). In some embodiments, clicking on a table of contents entry results in directly addressing the first page of the associated section. Any user interface is anticipated and the interface shown in FIG. 6 is one example. Likewise, there are many known ways to customize the look and functionality per a user's desires including customized screen appearances, customized action buttons, voice, images, signatures, writings, colors, etc, all of which are included here within.

Figure 7:
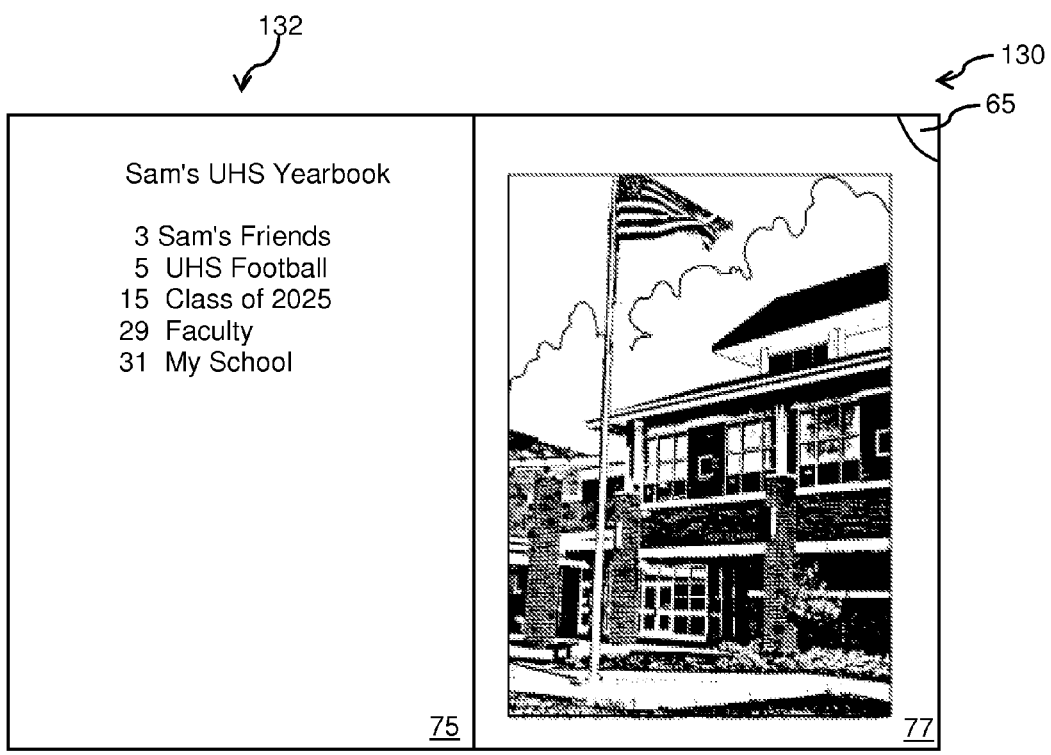
FIG. 7 illustrates the first typical user interface showing a yearbook table of contents customized for the second user.

Referring now to FIG. 7, the first typical user interface of the present invention showing a yearbook table of contents customized for the second user is shown. In this user interface 130, there are two virtual paper pages 75/77, similar to a typical printed yearbook table of contents. In this example, a high school has a format with a table of contents page 75 and a page with a photograph of the front of the high school 77. The table of contents page 75 of this user interface 130 contains a table of contents 132 customized for the second user (Sam) including sections selected by/for Sam: Sam's Friends (page 3), Football (page 5), class photographs (page 15), Faculty (page 29) and photographs of the high school (page 31). In this example, Sam has two custom selected pages of photographs of his friends and he is not involved in Soccer or Band and has decided not to include the Soccer or Band sections in his yearbook. Again, an icon 65 is provided to page forward/backward. By clicking and holding on of the page turn icons 65 then pulling it right (or left for opposite page), the user will turn the page to the previous (next page). In some embodiments, clicking on a table of contents entry results in directly addressing the first page of the associated section. Any user interface is anticipated and the interface shown in FIG. 7 is one example.

Figure 8:
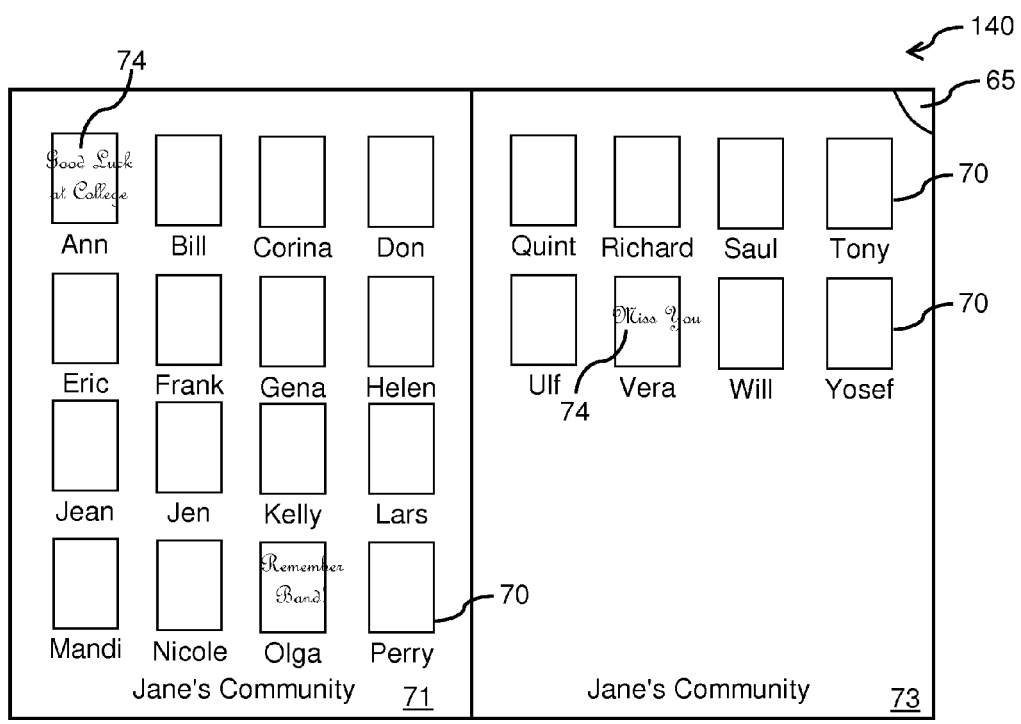
FIG. 8 illustrates the first typical user interface showing yearbook pictures selected by a first user including text annotations.

Referring now to FIG. 8, the first typical user interface of the present invention showing yearbook pictures selected by a first user including text annotations is shown. In this user interface 140, there are two virtual paper pages 71/73 of photographs 70, similar to a typical printed yearbook. In this example, photographs 70 of a subset of all students that were selected by a first user (Jane) are shown similar to FIG. 3 except, in this example, some pictures 70 are signed or written upon 74 by other users. In the example shown, text messages 74 are overlaid upon the other user's photographs 70. In some embodiments, handwriting input is used to capture the signatures/messages 74 while in other embodiments, text messages 74 are overlaid over the pictures 70. In some embodiments, the text overlay 74 is made to be optionally visible so the user (Jane) is able to mute the text 74 and see the photographs 70 in their entirety. In some embodiments, the text overlay 74 is presented in a faded or translucent font to permit viewing of the photographs 70 with minimal distortion.

Again, an icon 65 is provided to page forward/backward. By clicking and holding on of the page turn icons 65 then pulling it right (or left for opposite page), the user will turn the page to the previous (next page). Any user interface is anticipated and the interface described is one example.

Figure 8A:
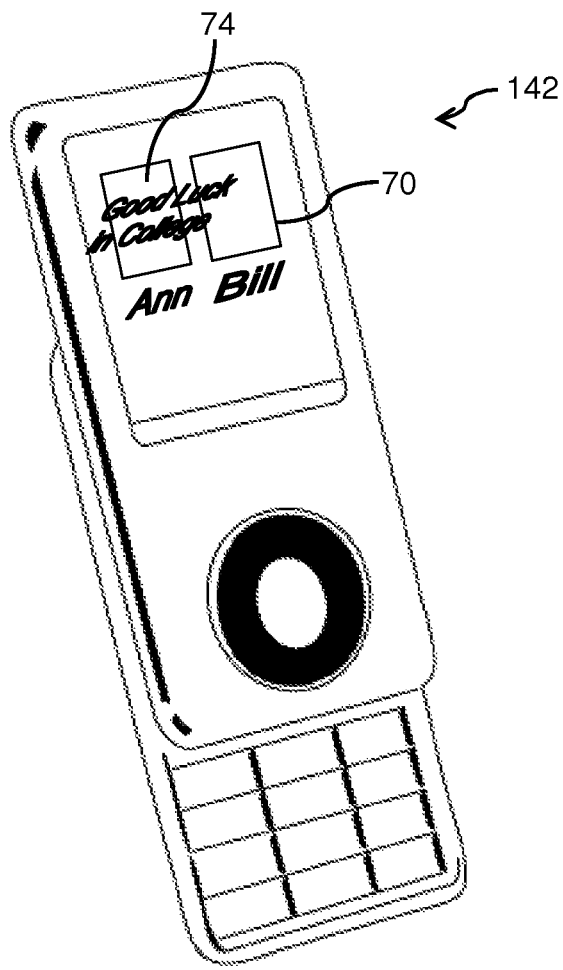
FIG. 8A illustrates a third typical user interface showing yearbook pictures selected by a first user including text annotations.

Referring now to FIG. 8A, a third typical user interface of the present invention showing yearbook pictures selected by a first user including text annotations is shown. In this user interface 142, there is one virtual page of photographs 70, similar to what might be displayed on a cell phone or PDA. In this example, photographs 70 of a subset of all students that were selected by a first user (Jane) are shown. In this example, one picture 70 is signed or written upon 74 by another user. In the example shown, the text message 74 is overlaid upon the other user's photograph 70. In some embodiments, handwriting input is used to capture the signatures/messages 74 while in other embodiments, text messages 74 are overlaid over the pictures 70. In some embodiments, the text overlay 74 is made to be optionally visible so the user (Jane) is able to mute the text 74 and see the photographs 70 in their entirety. In some embodiments, the text overlay 74 is presented in a faded or translucent font to permit viewing of the photographs 70 with minimal distortion.

In integrated social network and yearbook systems, it is anticipated that the annotation (e.g. text 74) is added through the social networking user interface and authorization to add annotations is provided by buddy capabilities. If a member wants to enable some set of individuals (e.g. friends) to annotate the member's customizable yearbook, then the member need only add the set of individuals as buddies and, possibly, indicate that buddies are allowed to annotate the member's customizable yearbook.

Figure 8B:
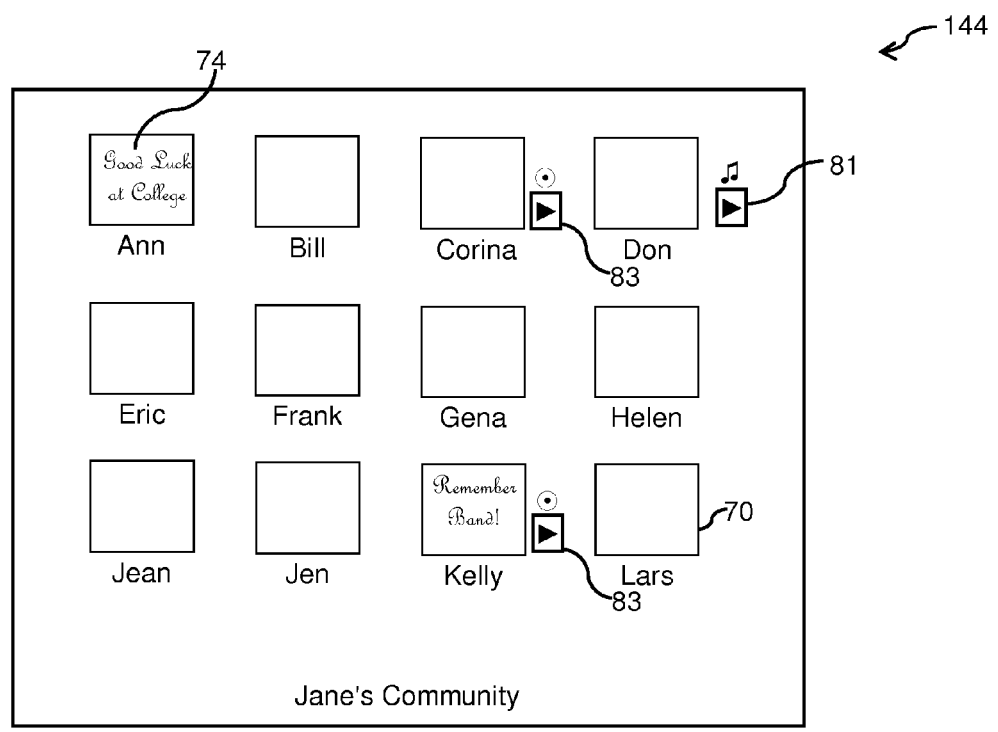
FIG. 8B illustrates a fourth typical user interface showing yearbook pictures selected by a first user including text annotations, voice annotations and video annotations.

Referring now to FIG. 8B, a fourth typical user interface of the present invention showing yearbook pictures selected by a first user including text annotations, voice annotations and video annotations is shown. In this user interface 144, there is one virtual page of photographs 70, similar to a typical interface shown on a personal computer. In this example, photographs 70 of a subset of all students that were selected by a first user (Jane) are shown similar to FIG. 3 except, in this example, some pictures 70 are signed or written upon 74 by other users, similar to that of FIG. 8 and FIG. 8A. Additionally, in this example, video 83 and audio 81 annotations are associated with some photographs 70. For example, one of Jane's friends, Corina has created a video segment saying goodbye to Jane, and, to view that segment, Jane selects (clicks on) the "play" icon 83 associated with Corina's photograph 70. In some embodiments, the video segment is shown in a new window with controls for pause, replay, stop, etc., as known in the industry. In some embodiments, audio is included with the video segment as known in the industry. In some embodiments, the video segment is shown in place of the original photograph 70. Any location of playback, including alternate display devices is anticipated and included here within. As previously described, in integrated social network and yearbook systems, it is anticipated that the annotation (e.g. text 74) is added through the social networking user interface and authorization to add annotations is provided by buddy capabilities. If a member wants to enable some set of individuals (e.g. friends) to annotate the member's customizable yearbook, then the member need only add the set of individuals as buddies and, possibly, indicate that buddies are allowed to annotate the member's customizable yearbook. Through this, time shifting is provided, in that, annotations are possible long before the customized yearbook is published, as opposed to the printed yearbook scenario in which students receive their printed books and scramble during the last few days of the year to obtain all the signatures that they want.

Another example is of another of Jane's friends, Don, who has created an audio segment saying, for example, goodbye to Jane, and, to listen to that segment, Jane selects (clicks on) the "play" icon 81 associated with Don's photograph 70. In some embodiments, the audio segment is played using a new window with controls for pause, replay, stop, etc., as known in the industry. In some embodiments, the audio segment is played and the play icon 81 is replaced with a stop icon until the audio segment completely plays. Any location of playback, including headphones, speakers, etc. is anticipated and included here within.

Figure 9:
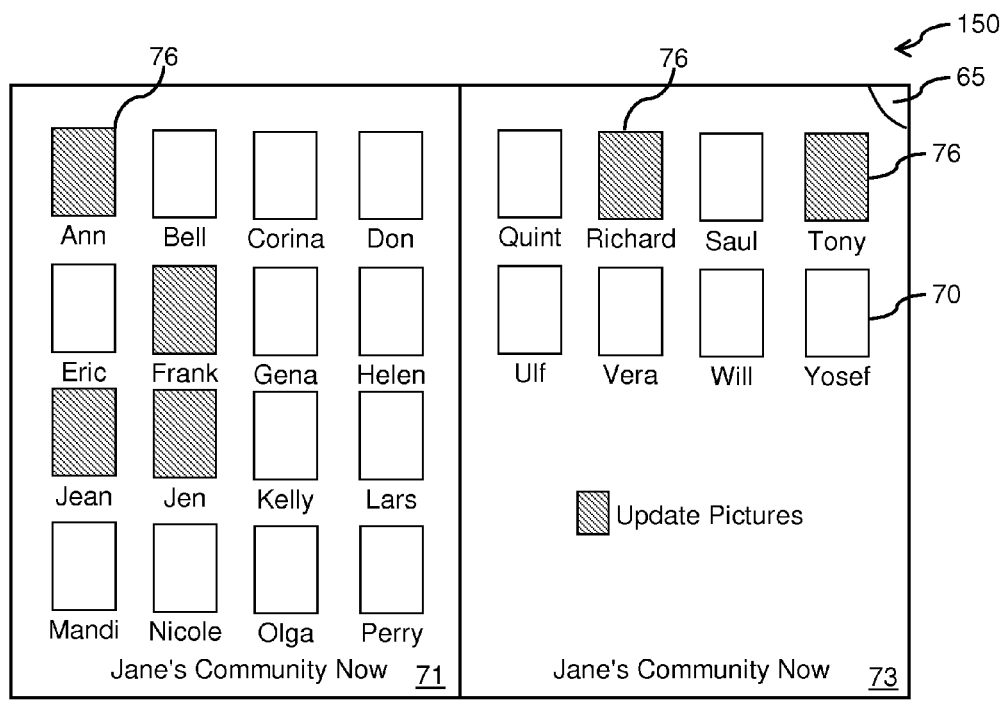
FIG. 9 illustrates a first typical user interface showing yearbook pictures selected by a first user including updated pictures.

Referring now to FIG. 9, the first typical user interface of the present invention showing yearbook pictures selected by a first user including updated pictures is shown. In this user interface 150, there are two virtual paper pages 71/73 of photographs 70, similar to a typical printed yearbook. In this example, photographs 70 of a subset of all students that were selected by a first user (Jane) are shown. This is an example of how a user (Jane) customizes her yearbook by selecting one or more other user's photographs 70 to display them on a "favorites" page. In this user interface, some or all of the photographs 70 are replaced by updated photographs 76. This feature is made possible by the continuously available yearbook of the present invention. Since the content by group 54 is present on the server 50, users and administrators have the ability to change, update and add data including text, photographs, video, audio, etc., to, for example, the content by group file 54. For example, in some embodiments capabilities exist to add new text messages 74, video message 83 or audio messages 81 long after the yearbook is finalized/published (e.g., after graduation since with a living yearbook, the term finalized has little meaning when the yearbook lives past graduation). Another example is the addition of updated photographs 76 as shown in FIG. 9. For instance, updated photographs 76 of the students are taken during the 10 year reunion and stored in the content by group file 54. The updated photographs 76 are not available to those users who have paper copies of the yearbook. For users who are connected to the Network 40, the updated photographs 76 (text, audio, video, etc) are selectively available when they view their yearbook. In such, when the user accesses their yearbook, a connection is made from their viewing device (e.g., personal computer) to the server 50 through the Network 40. In some embodiments, the user has a physical media (e.g., DVD disk) containing their yearbook. In this embodiment, the viewer software checks with the server 50 to find updated photographs 76 and, if found, uploads the updated photographs 76 to the user's device. In some embodiments, the updated photographs 76 are stored (cached) on the user's device (e.g., hard disk) to improve access time. In some embodiments, the user has an option to select the original photographs 70 or the updated photographs 76. In some embodiments, the user has an option to "morph" the photographs from the original photograph 70 into the updated photograph 76. Updates include, but are not limited to, updated photographs, text messages, audio messages, video messages, broadcast messages, alumni announcements, etc.

As before, an icon 65 is provided to page forward/backward. By clicking and holding on of the page turn icons 65 then pulling it right (or left for opposite page), the user will turn the page to the previous (next page). Any user interface is anticipated and the interface shown in FIG. 9 is one example.

Figure 10:
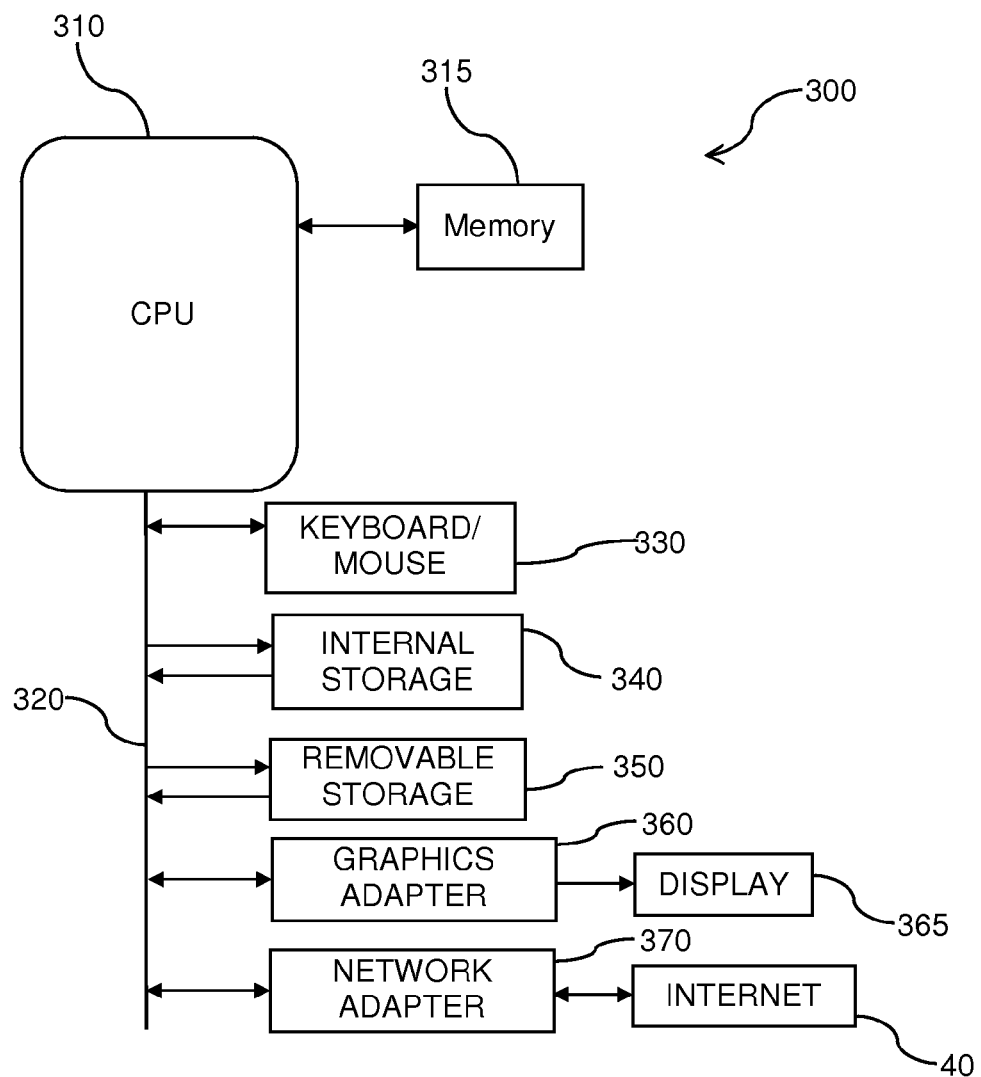
FIG. 10 illustrates a typical computer system.

Referring to FIG. 10, a schematic view of a typical terminal device computer system 300 of the present invention will be described. This exemplary configuration is well known in the prior art. Although shown in a much simplified configuration having a single processor 310, many different computer architectures are known that accomplish similar results in a similar fashion and the present invention is not limited in any way to any particular computer system. The present invention works well utilizing a single processor system as shown; a multiple processor system where multiple processors share resources such as memory and storage; or a multiple server system where several independent servers operate in parallel or any combination. In this, a processor 310 is provided to execute stored programs that are generally stored for execution within the memory 315. The processor 310 can be any processor or a group of processors, for example an Intel Pentium-4® CPU or the like. The memory 315 is connected to the processor and can be any memory suitable for connection with the selected processor 310, such as SRAM, DRAM, SDRAM, RDRAM, DDR, DDR-2, etc. Also connected to the processor 310 is a system bus 320 for connecting peripheral subsystems such as a keyboard/mouse 330, internal storage 340, removable storage 350, graphics adapter 360 and network adapter 370. The graphics adapter 360 receives commands and display information from the system bus 320 and generates a display image that is displayed on the terminal's display 365. The network adapter 370 receives commands and data from the system bus 320 and communicates with the World Wide Web or Internet 40, through a modem or other communication device (not shown).

In some embodiment, there is internal storage 340 and removable storage 350. The internal storage 340 is used, for example, to store programs, executable code and data persistently, while the removable storage 350 is used, for example, to load programs, executable code, content and data from the media into the internal storage 340. The internal storage 340 is, for example, a hard disk drive, flash memory, etc. Other examples of persistent internal storage include core memory, FRAM, flash memory, battery-backed RAM, etc. Other examples of removable storage 350 include CDRW, DVD, DVD writeable, compact flash, flash "jump" drives, other removable flash media, floppy disk, ZIP®, laser disk, etc. In some embodiments, other devices are connected to the system through the system bus 320 or with other input-output connections. Examples of these devices include printers; mice; graphics tablets; joysticks; and communications adapters such as modems and Ethernet adapters.

Figure 11:
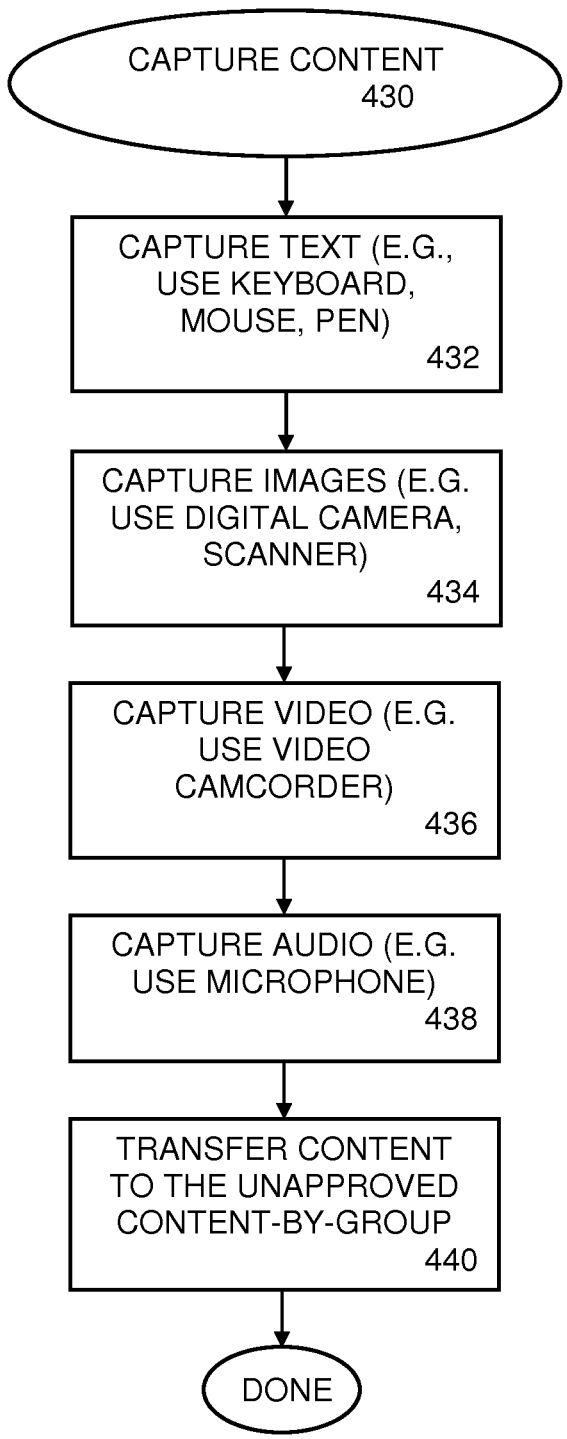
FIG. 11 illustrates a first flow chart of the yearbook system.

Referring to FIG. 11, a first flow chart of the present invention is shown. This is one example 430 of some typical steps involved in capturing content and others are anticipated as well as capturing content in different sequences. As known in the art, there are many ways to capture or enter content into a computer system and such is possible in many different sequences. For example, an image of a person is captured with a digital camera then the digital image is uploaded to a computer then some text is entered at a keyboard or with handwriting and associated with the digital image. In the example shown in FIG. 11, text is captured 432 using any of the known text input devices such as a keyboard, mouse, touch screen, scanner, pen-input, etc. Images are captured 434 using, for example, a digital camera, scanner, etc. Video is captured 436 using, for example, a digital camera or camcorder. Voice or music is captured 438 using, for example, a microphone. Once the content is captured, it is transferred or uploaded 440 to the unapproved content by group 58. Any sequence or combination of known methods of capturing content is anticipated and included here within.

Figure 12:
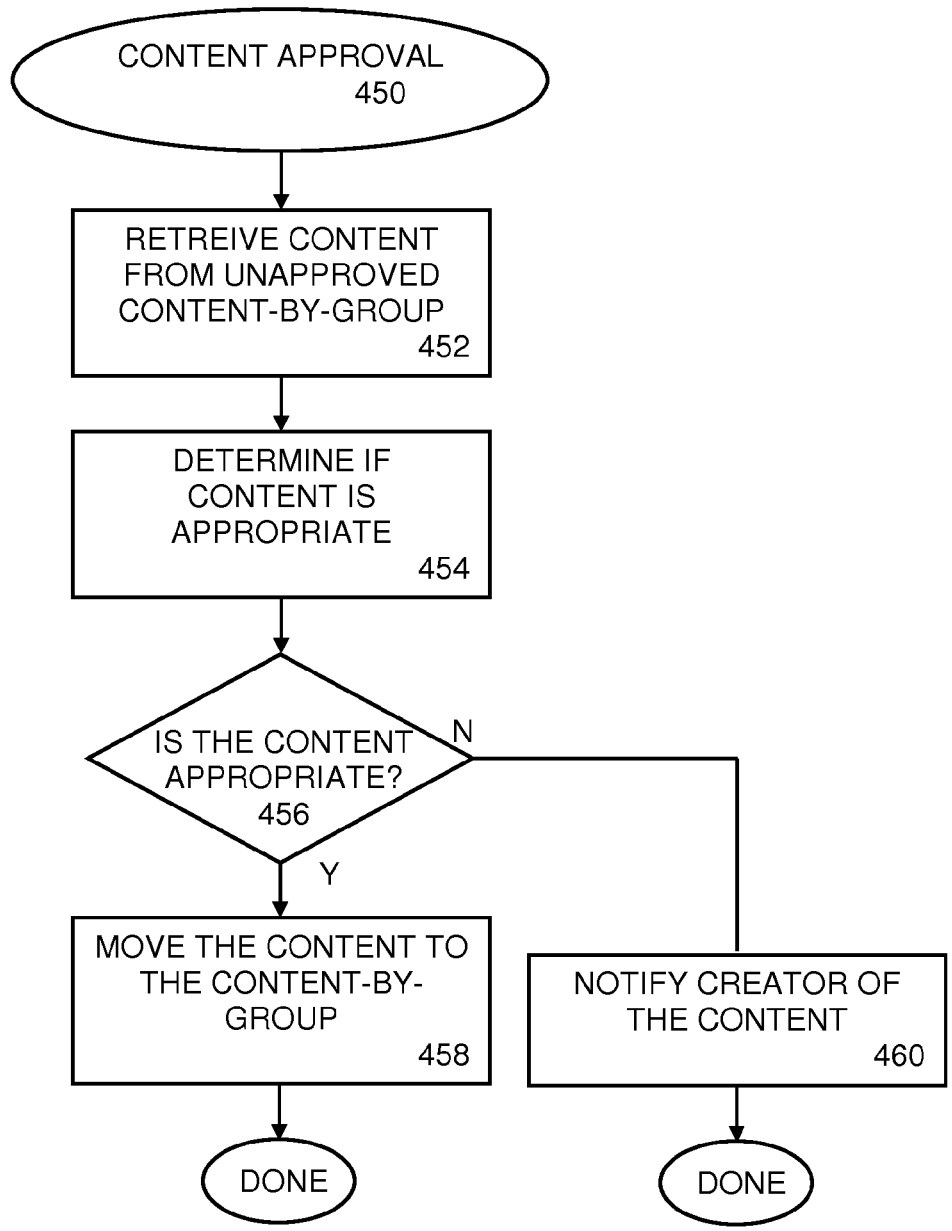
FIG. 12 illustrates a second flow chart of the yearbook system.

Referring to FIG. 12, a second flow chart of the present invention is shown. This flow 450 is an example of how an administrator views and determines if the uploaded content is appropriate for the target yearbook. For example, if the target yearbook is for a high school, nudity, foul language, obscene gestures, etc. are not appropriate. On the other hand, if the yearbook is for a production crew working on adult movies, then nudity might be appropriate. The flow begins with retrieving content 452 from the unapproved content by group 58. The content is retrieved as known in the industry, for example as an object such as an object relating to the photograph of one student, etc. Next, the administrator of content determines if the content is appropriate 454, for example, by reading the text, viewing the images/video and/or listening to the audio, as appropriate. If the content is appropriate 456, the administrator elects to move 458 the content to the content by group 54 file/database. If the content is not appropriate 456, the administrator notifies the creator 460, typically informing the creator of why the content is inappropriate.

Figure 13:
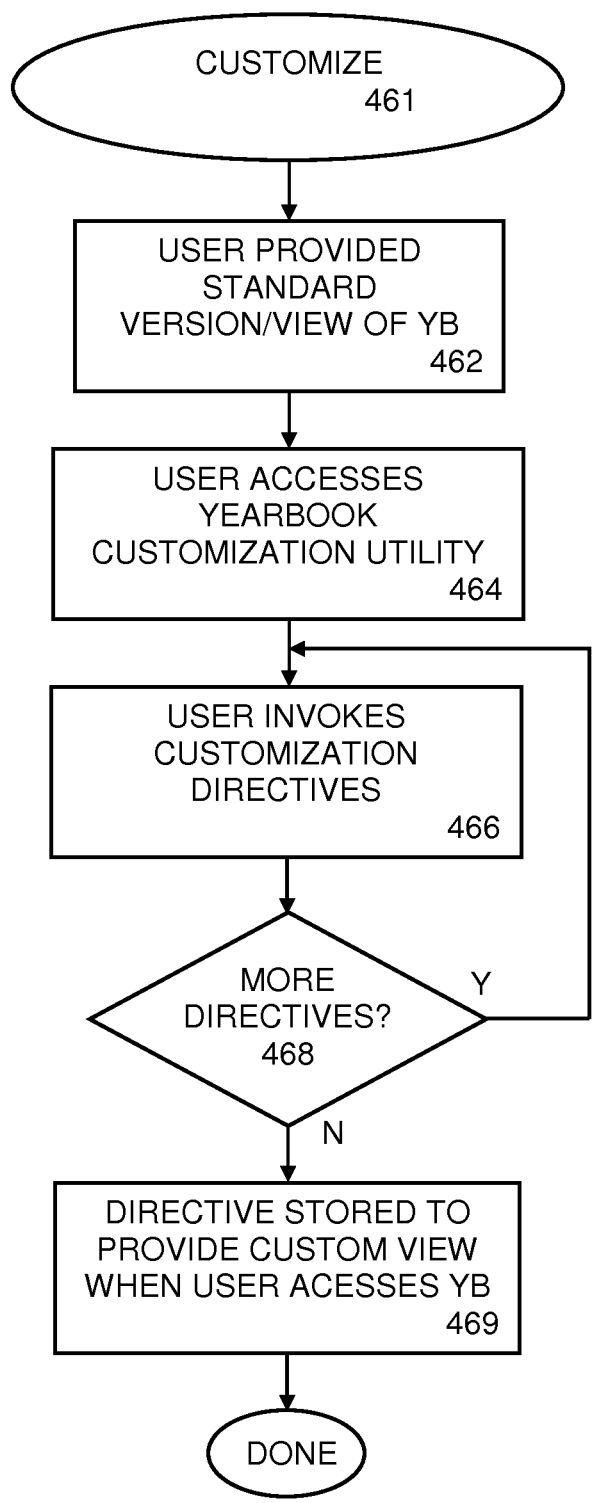
FIG. 13 illustrates a third flow chart of the yearbook system.

Referring to FIG. 13, a third flow chart of the present invention is shown. It is anticipated that, in some embodiments, all users (e.g. students) are provided with the same yearbook content and all users see the same content along with all of the robust features provided with the present invention. It is also anticipated that customization features be provided, enabling each user to customize the look of their own yearbook starting with the color scheme, base yearbook content, filtering, and/or adding to the base content. For example, one user indicates (profile) they are part of a certain team (e.g. football), making certain yearbook content related to football prominent while another student indicates that they are part of band, making other yearbook content related to band more prominent. Furthermore, in some examples, one user includes content that no other user includes such as messages from personal friends, etc. One possible flow 461 is show for an exemplary method for a user to customize the look and operation of their individual version of the yearbook. In such, the user is provided a standard, un-customized version or view of the yearbook 462. In such, it is preferred, though not required, that the yearbook be in a final or close-to-final state so that the user is working with a version that has content that is somewhat stable. In this exemplary method, the user accesses a yearbook customization utility 464. The yearbook customization utility 464 provides the user with a repertoire of directives or tools that support customization of the user's view and operation of the yearbook. For example, one such directive or tool provides the user with a tool to enter names of their friends to create a friends page as shown in FIGS. 8-9. Other directives provide, for example, background colors, themes, table of contents editing, content selection (e.g., select to include the soccer team), etc.

The user invokes as many directives as desired 466 until they are finished 468. The directives are stored 469 to provide the customized view to the user each time they access the yearbook (e.g. when access online version) or when physical media 32 is created (e.g. delivered on a DVD), such that the user's custom view will be represented on the physical media 32.

Figure 14:
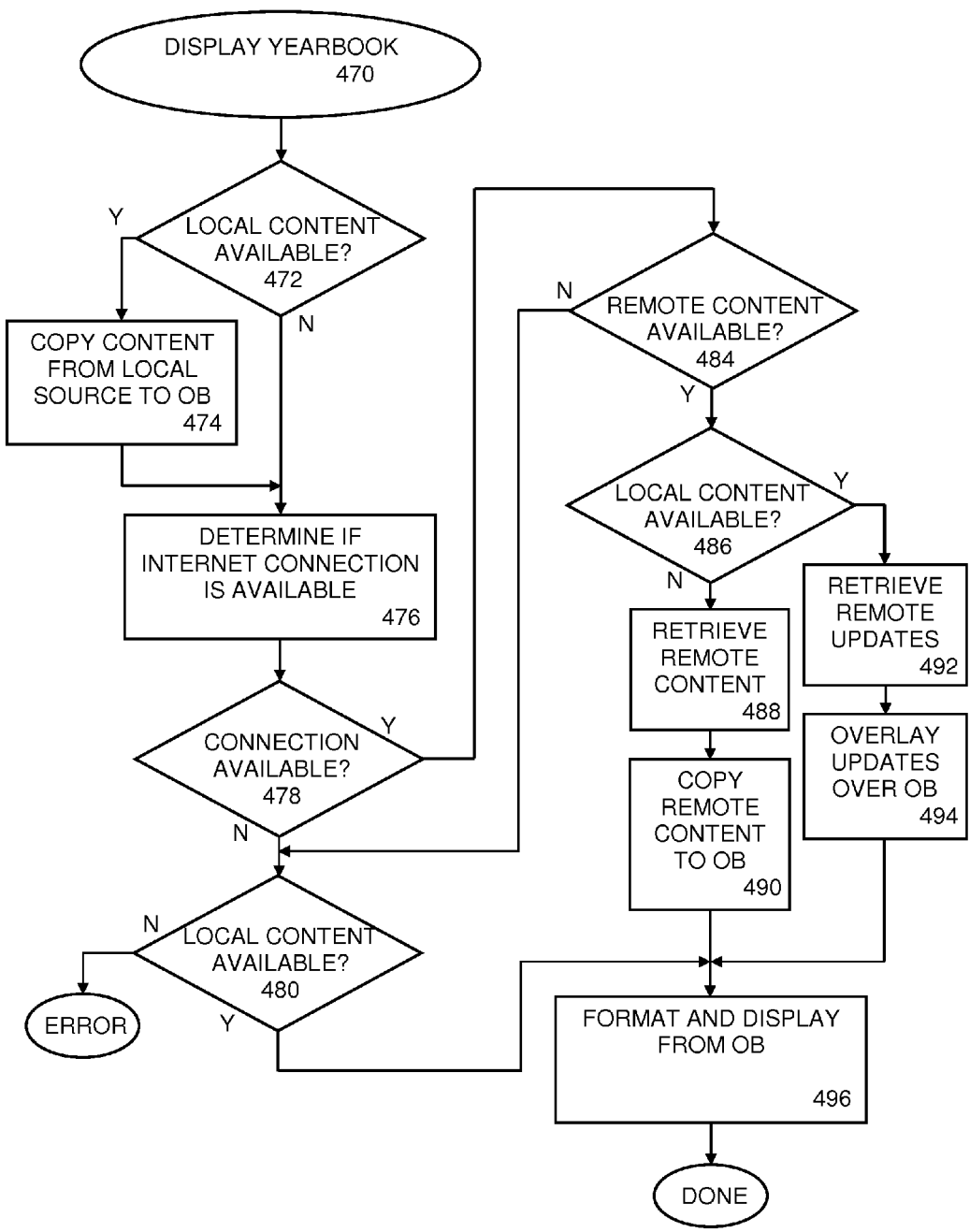
FIG. 14 illustrates a fourth flow chart of the yearbook system.

Referring to FIG. 14, a fourth flow chart of the present invention is shown. This is one possible flow 470 showing the display of yearbook content. If there is local content available 472, for example on a local computer hard drive or from a removable media (e.g. DVD), the content is retrieved 474 from the local source(s) and stored in, for example, an output buffer. Next, it is determined if an Internet connection is available 476. If no Internet connection is available 478 and no local content is available 480, an error occurred since the needed content is not accessible. If no Internet connection is available 478 but local content is available 480, the content from the output buffer (OB) is formatted 496 and displayed (e.g. on display 360/365 or on television 62) for viewing by the user.

If an Internet connection is available 478 then it is determined if remote content is available 484. If no local content is available 486, the remote content is retrieved 488 (e.g., downloaded) and copied to the output buffer 490. If local content is available 486, the local content is already available in the output buffer (OB) and remote updates are retrieved 492 and the remote updates are used to overlay parts or all of the local content in the output buffer 494. For example, if the local content has the wrong image of one person and a corrected image is available in the content by group 54 on the server 50, the corrected image is downloaded from the server 492 and used to overwrite the wrong image in the output buffer 494. Another example is updates to advertising content. When the yearbook was originally published, certain locations of some or all pages were reserved for advertisements such as company logos, sponsor names, short video segments advertising items relevant to the graduating students, etc. As time passes, there are many reasons to replace such advertisements such as, the advertisement is no longer relevant to the age of the students, an advertising contract has expired with one or more of the advertisers, a new advertiser is paying to have their advertisement displayed, etc. It is also anticipated that, for some advertisement spots, multiple advertisers share that spot with some random allocation of viewing time to each shared advertisement—for example, a first advertisement is shown every other time the page is viewed and a second advertisement is shown on alternate views.

With updates to the advertisements, remote updated advertisements are retrieved 492 and the remote updated advertisements are used to overlay parts or all of the locally stored advertisements. In this way, an advertiser has the ability to replace their advertisement with a new, fresh advertisement or the administration has the ability to replace one advertiser with another, especially as advertising contracts expire and new advertisers desire the exposure to a certain homogeneous age group. This is important as the student body ages, interests change from sports cars to diapers, then to wine and cheese, then to antacids, etc. Once the replacement advertisement is downloaded, it replaces the previous advertisement and is displayed per the display algorithm until it is replaced.

The update facility enables future correction/sanitization to remove or modify any material that, at some time in the future, is deemed objectionable. For example, if at the time of high school, the drinking age was 16 and some students were shown holding cans of beer, after the drinking age has changed to 21, it might be desired to replace those images with students holding bottles of water. With updates to the images, text, audio, etc., remote updated content is retrieved 492 and the remote updated content replaces parts or all of the locally stored content.

Finally, the content in the output buffer is formatted and displayed 496 for viewing by the user.

Figure 15:
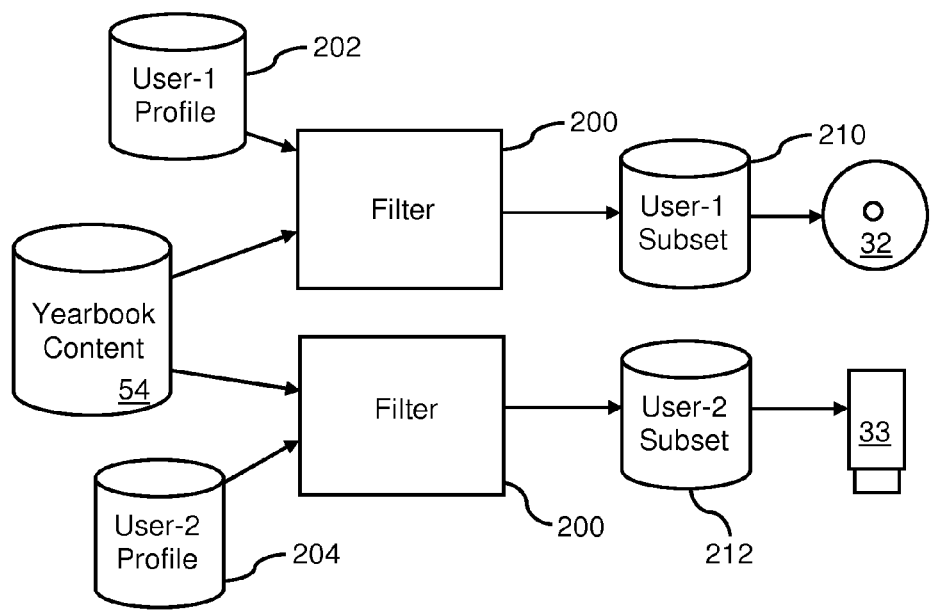
FIG. 15 illustrates a diagram of content filtering of the yearbook system.

Referring to FIG. 15, a diagram of content filtering of the present invention is shown. In this, the yearbook content 56 is filtered based on user profiles 202/204 by filters 200 and a user-subset 210/212 is saved for each user. This example shows a greatly simplified, two-user system and it is anticipated that a single yearbook will have many users with many user profiles. In this example, a first user has a user profile 202 and a second user has second user profile 204. For example, an entry in the first user profile indicates that the first user is a member of the high school band and an entry in the second user profile indicates that the second user is a member of the high school science club. In such, the filter 200 uses the first user profile 202 to select content that is customized for the first user and stores that content in user-1 subset 210 and uses the second user profile 204 to select content that is customized for the second user and stores that content in user-2 subset 212. In this example, the user-1 subset 210 is written to a removable optical media 32 (e.g. CD-ROM, DVD) and the user-2 subset 212 is written to a removable media disk 33 (e.g. jump drive). It is anticipated that the user-subsets 210/212 for many users be delivered in any known form including, but not limited to, online access, transfer through a network, rotating media (e.g. CD-ROM), removable media (e.g. flash drive, jump drive, compact flash, memory stick, etc.), access through a social network web page or other web page, and the like.

Figure 16:
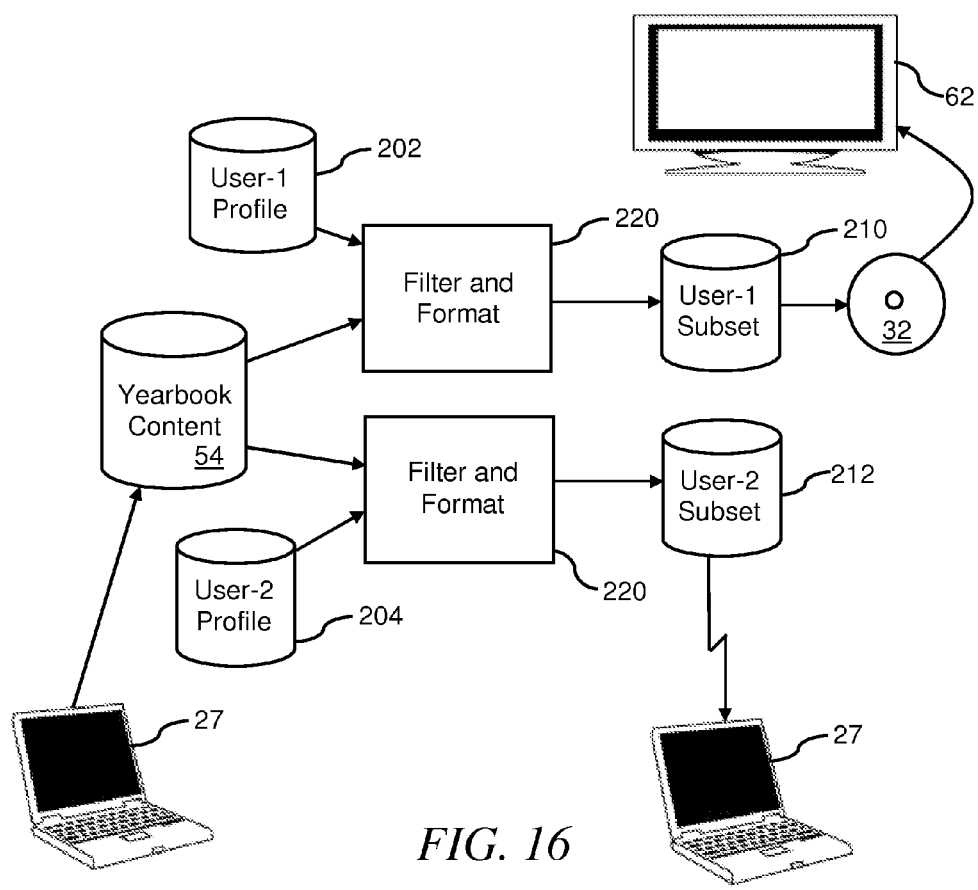
FIG. 16 illustrates a diagram of device specific content filtering of the yearbook system.

Referring to FIG. 16, a diagram of device specific content filtering of the present invention is shown. In this, the yearbook content 54 is created and uploaded from a user computer 27. The content 54 is filtered and formatted based on user profiles 202/204 and the target device that will be used by the user by filters 220 and a user-subset 210/212 is saved for each user. This example shows a greatly simplified, two-user system, each user having a different device. In this example, the first user will view the yearbook on a television equipped with an internal DVD player and the second user will view the yearbook on a personal computer 27. It is anticipated that a single yearbook will have many users with many user profiles and many types of output devices. In this example, a first user has a user profile 202 and a second user has a second user profile 204. For example, an entry in the first user profile indicates that the first user is a member of the high school band and an entry in the second user profile indicates that the second user is a member of the high school science club. In such, the filter 220 uses the first user profile 202 to select content that is customized for the first user, formats the content for the device that the first user will use to display their yearbook content (e.g., a television 62 with integrated DVD player) and stores that content in user-1 subset 210. The filter 221 uses the second user profile 204 to select content that is customized for the second user, formats the content for the device that the second user will use to display their yearbook content (e.g., a personal computer 27) and stores that content in user-2 subset 212. In this example, the user-1 subset 210 is written to a removable optical media 32 (e.g. DVD disk) and the DVD disk is transferred to the user's television 62. The user-2 subset 212 is transferred to the second user's personal computer 27, preferably through a network connection. It is anticipated that the user-subsets 210/212 for many users be delivered in any known form including, but not limited to, online access, transfer through a network, rotating media (e.g. CD-ROM), removable media (e.g. flash drive, jump drive, compact flash, memory stick, etc) and the like.

Figure 17:
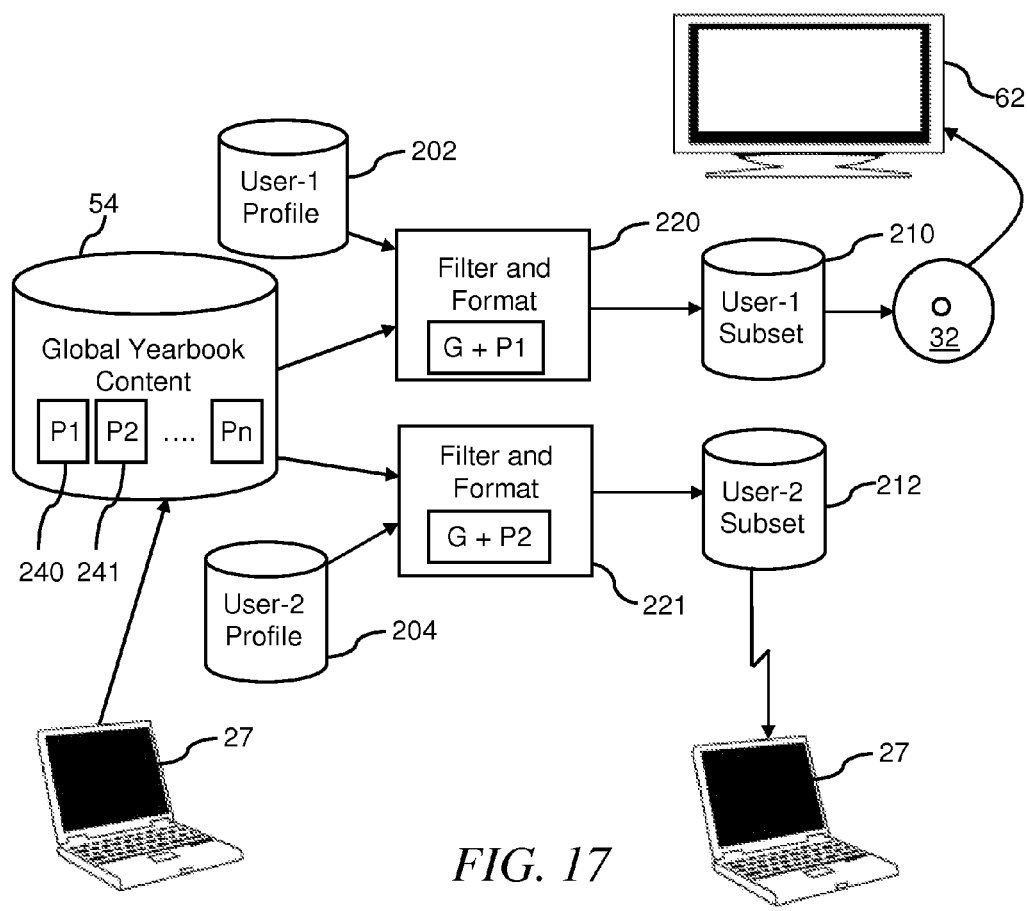
FIG. 17 illustrates a diagram of global and private content of the yearbook system.

Referring to FIG. 17, a diagram of global and private content of the present invention is shown. In this, the yearbook content 54 is created and uploaded from a user computer 27. The content 54 includes global content such as images and text for all users of the yearbook. The content 54 also includes one or more private contents P1, P2 . . . Pn 240/241. The private content 240/241 is associated with one or a subset of the users of the yearbook and is, for example, textual, audio or video annotations from other users such as another user's signature of one's yearbook. The content 54 is filtered and formatted based on user profiles 202/204 and, for example, the target device that will be used by the user by filters 220/221 and a user-subset 210/212 is saved for each user. A filter for the first user will include the global content and the private data for the first user 240 while the filter for the second user will include the global content and the private data for the second user 241 This example shows a greatly simplified, two-user system, each user having a different device. In this example, the first user will view the yearbook on a television equipped with an internal DVD player and the second user will view the yearbook on a personal computer 27. It is anticipated that a single yearbook will have many users with many user profiles and many types of output devices. In this example, a first user has a user profile 202 and a second user has second user profile 204. For example, an entry in the first user profile indicates that the first user is a member of the high school band and an entry in the second user profile indicates that the second user is a member of the high school science club. In such, the filter 220 uses the first user profile 202 to select content that is customized for the first user, formats the content for the device that the first user will use to display their yearbook content (e.g., a television 62 with integrated DVD player) and stores that content in user-1 subset 210. The filter 220 uses the second user profile 204 to select content that is customized for the second user, formats the content for the device that the second user will use to display their yearbook content (e.g., a personal computer 27) and stores that content in user-2 subset 212. In this example, the user-1 subset 210 is written to a removable optical media 32 (e.g. DVD disk) and the DVD disk is transferred to the user's television 62. The user-2 subset 212 is transferred to the second user's personal computer 27, preferably through a network connection. It is anticipated that the user-subsets 210/212 for many users be delivered in any known form including, but not limited to, online access, transfer through a network, rotating media (e.g. CD-ROM), removable media (e.g. flash drive, jump drive, compact flash, memory stick, etc) and the like. When the first user views the yearbook, they see their selection of global content (e.g. classmates, football, science team) along with their private data 240 (e.g. audio message from another class mate, signatures of football team overlaid on a full-team image). When the second user views the yearbook, they see their selection of global content (e.g. classmates, glee-club, cheerleading) along with their private data 241 (e.g. audio message from another class mate, signatures of other cheerleaders overlaid on an image of all of the cheerleaders).

Figure 18:
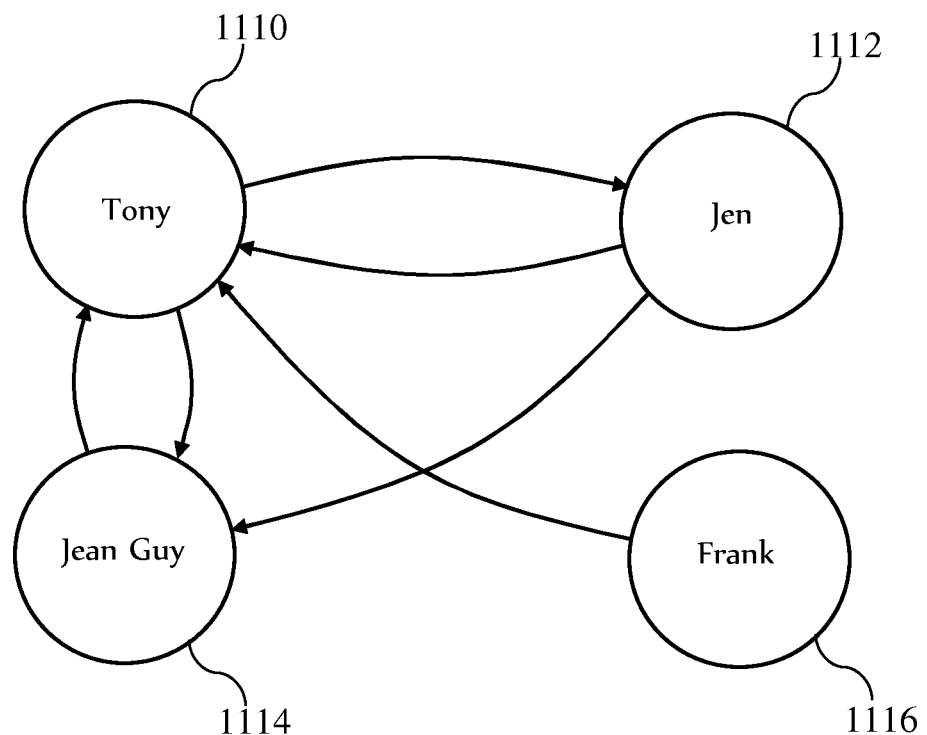
FIG. 18 illustrates a diagram of a typical buddy arrangement in the yearbook system.

Referring to FIG. 18, a diagram of a typical buddy arrangement in the yearbook system is shown. Tony 1110 is a buddy to everyone depicted by inwardly directed arrows. This means that Tony's user id is included in Jen's, Jean Guy's and Frank's buddy list. Jen 1112 is a buddy of Tony 1110. Jean Guy 1114 is a buddy of Tony 1110. Jen 1112 and Frank 1116 are not buddies to each other. Through the social network interface, this exemplary buddy list provides structure for communications, posting within the social network and posting within the custom yearbook. For example, Tony 1110 is a buddy of Jen 1112 and Jen 1112 is a buddy of Tony 1110. Based upon this relationship, Tony 1110 can see Jen's postings on the social network and Jen 1112 can see Tony's postings. This is somewhat similar to how a typical social network operates except, with the integration of the social network with the customized yearbook, now Tony 1110 and Jen 1112 are able to annotate each other's custom yearbook with signatures, writings, audio, pictures, etc. In such, if Tony 1110 wants to place a message in Jen's yearbook (similar to that shown in FIG. 8A), Tony 1110, after logging onto the social network and customized yearbook system, enters the message and applies it to his picture in Jen's yearbook. Tony 1110 is allowed to perform this operation because Jen 1112 has declared Tony 1110 as a buddy. Since Frank 1116 has not indicated that Tony 1110 is a buddy (e.g. no arrow pointing from Tony 1110 to Frank 1116), Tony 1110 is prevented from placing, for example, text over Tony's image on Frank's customized yearbook.

Figure 19:
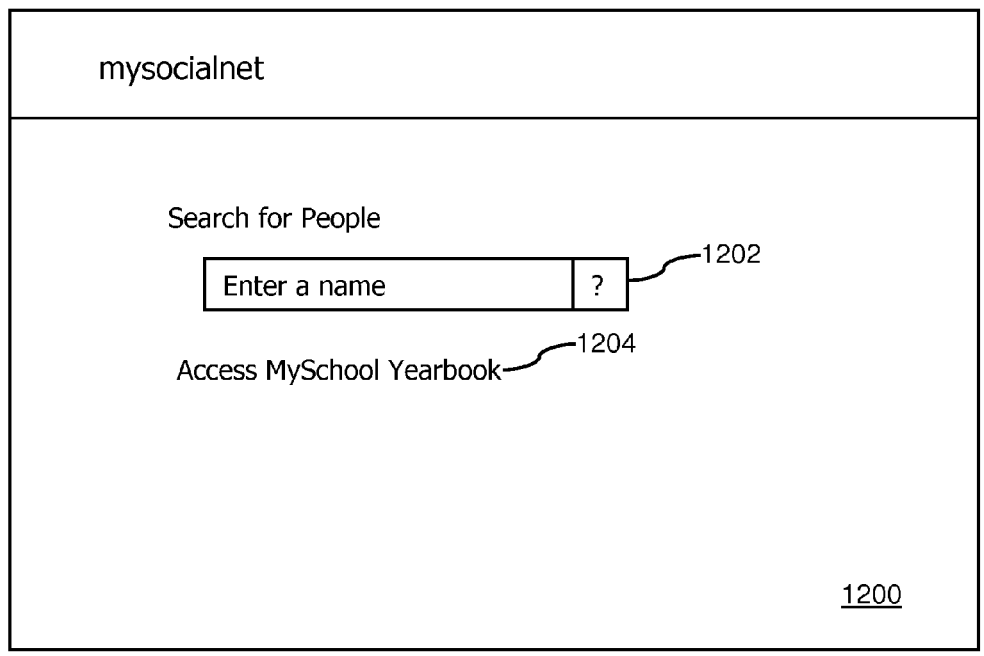
Figure 20:
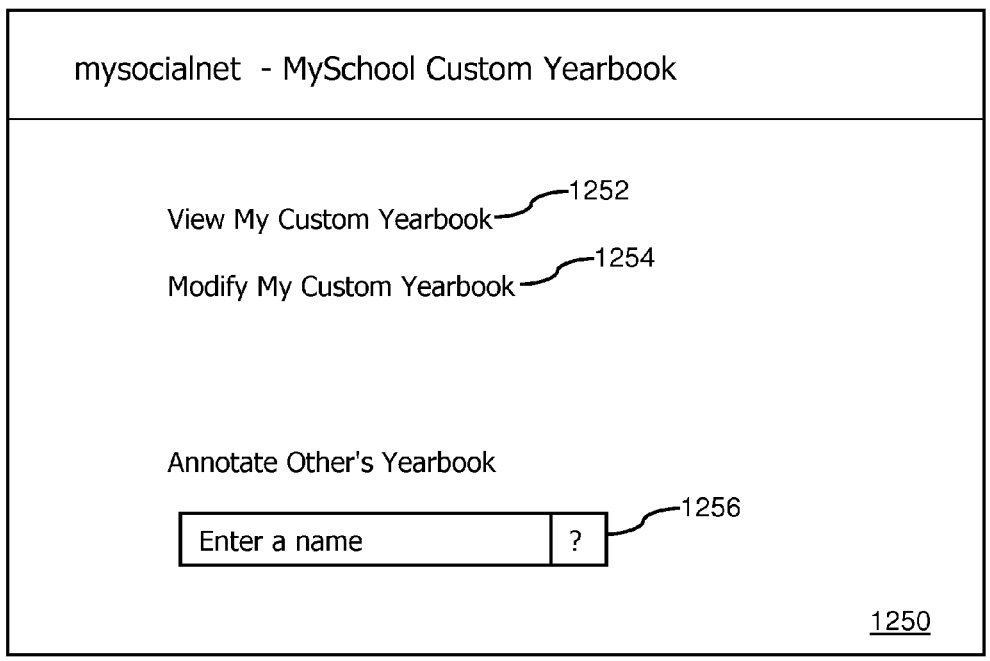

Referring to FIGS. 19-22, exemplary social network and yearbook user interfaces are shown. In FIG. 19, a simplified and exemplary social network and yearbook user interfaces 1200 includes a directive to search for other people on the social network 1202 and a directive to access the user's school yearbook 1204. It is anticipated that similar, different, more, or less directives will be present on the social network and yearbook user interfaces 1200. Selection of the directive to access the user's school yearbook 1204 results in the display of a custom yearbook page 1250 as exemplified in FIG. 20. Again, it is anticipated that similar, different, more, or less directives will be present on the social network and yearbook user interfaces 1250. The custom yearbook page 1250 provides exemplary directives 1252/1254/1256 for the user to view their customized yearbook 1252, modify their customized yearbook 1254, and to annotate another's yearbook 1256. Selection of view my customized yearbook 1252 will present the user's customized yearbook as, for example, in FIGS. 2-9. Selection of modify my customized yearbook 1254 will present pages that have directives to select what parts of the custom yearbook data 54 is included and how they are displayed.

Figure 21:
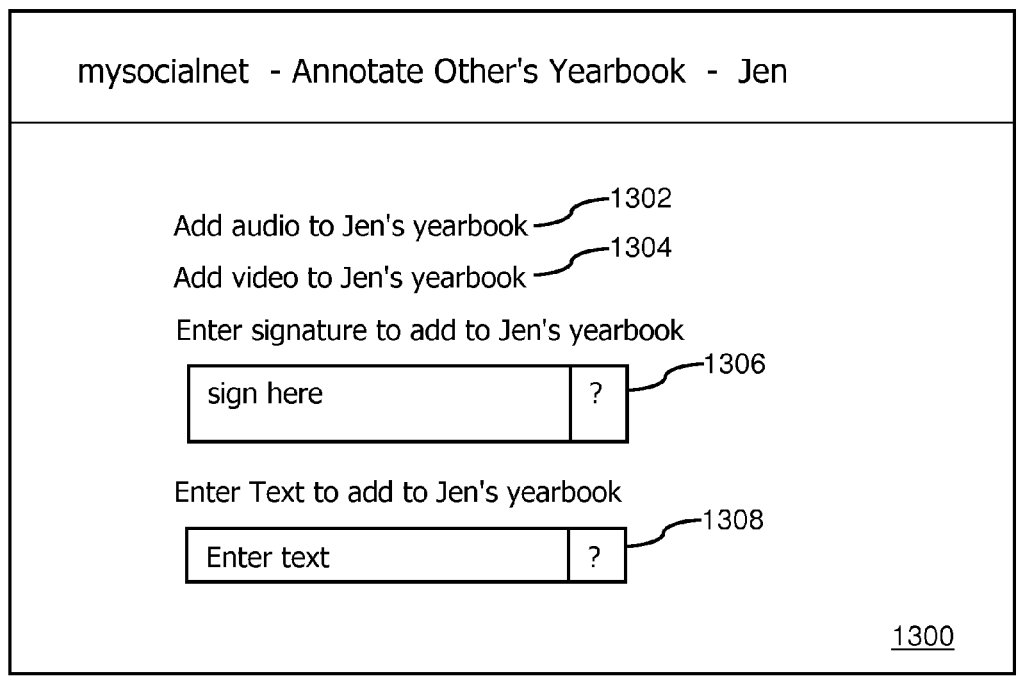

Selection of annotate other's yearbook 1256 will present a page similar to the annotation page 1300 in FIG. 21. In this, the user is provided with directives 1302/1304/1306/1308 for adding audio to another's yearbook 1302, for adding video to another's yearbook 1304, for adding handwritten text to another's yearbook 1306, and for adding printed text to another's yearbook 1308. Selection of adding audio to another's yearbook 1302 results in a page that will capture audio (or browse for an existing audio file), store the audio in a file, and append the audio file onto the buddy's yearbook to be associated with the user's image in the buddy's yearbook. Selection of adding video to another's yearbook 1304 results in a page that will capture video (or browse for an existing video file), store the video in a file, and append the video file onto the buddy's yearbook to be associated with the user's image in the buddy's yearbook. Alternately, the user places their signature in the signature box 1306 and the user's signature is appended onto the buddy's yearbook to be associated with the user's image in the buddy's yearbook. Similarly, the user enters text in the text box 1308 and the text is appended onto the buddy's yearbook to be associated with the user's image in the buddy's yearbook. It is anticipated that the user can annotate multiple buddy's yearbooks with one operation, though individual annotation is likely more personal.

Using the social network interface, the user is free to use social network communications or email to request signature from other members/buddies. In some embodiments, a directive is provided to select all members from which the user desires signatures (similar to the interface 1400 of FIG. 23) and each selected member of the organization is requested to sign that user's customized yearbook.

In FIG. 22, an exemplary yearbook customization interface 1350 is shown as part of the social networking pages. In this, the social network user, when logged onto the social network, has selected "modify my custom yearbook" 1254 (see FIG. 20). The social network system presents that user's existing customization choices (if any have been made) or default choices (if none have been previously made) and the user has the ability to make changes to how their yearbook will be displayed/printed. In the example shown, the user has not entered a nickname 1352 and has indicated that they are members of the Football team, Track Team, Chess Club and Band 1354. In this exemplary interface, the user has a selection for opting out of advertisements 1358. For example, if the user selects "Yes," then their customized yearbook will be absent of advertisements. It is possible that the institution (e.g. school) will charge the user an additional fee if they opt out of advertisements. Similarly, the user has a selection for ordering a printed copy of the yearbook 1360. If the user selects "Yes," then their customized yearbook will be printed according to the customized directives. It is also likely that the institution (e.g. school) will charge the user a fee for the printed yearbook.

As shown in FIGS. 3, 3A, 4, 4A, 6, and 6A each user has the ability to include special pages of friends (e.g. Jane's Friends or Sam's Friends). In the exemplary user interface 1350, the user has a choice 1356 to include one or more extra pages of friends into their customized yearbook. If the user elects to include one or more pages of friends, one way to determine the list of friends whose images/pictures and names will appear on the user's friends page is through the social network buddy list. This is to say that, all members of the user's social network who are members of the organization (e.g. school) and also listed as buddies to that user will be included on that user's friend page(s). It is also anticipated that, those on the user's buddy list have the option to opt-out of being included on that user's friend page(s), for example, by declaring themselves as a buddy of that user (this would opt-in) or not declaring themselves as a buddy (this would opt-out). Therefore, in some embodiments of the social network and custom yearbook system, friend's images only appear on a user's friend page(s) if the friend is declared a buddy of the user and the user is also declared a buddy of the friend (e.g. two-way).

Note that, in some embodiments, the social network encompasses users that are not members of the institution (e.g., school). In such embodiments, members of the social network who are buddies with the user will not appear on the user's friend page(s) unless permission/authorization is provided by the organization. When finished, the user either selects "SAVE" 1362 to save these selections or "CAN" 1364 to cancel the elections.

Figure 23:
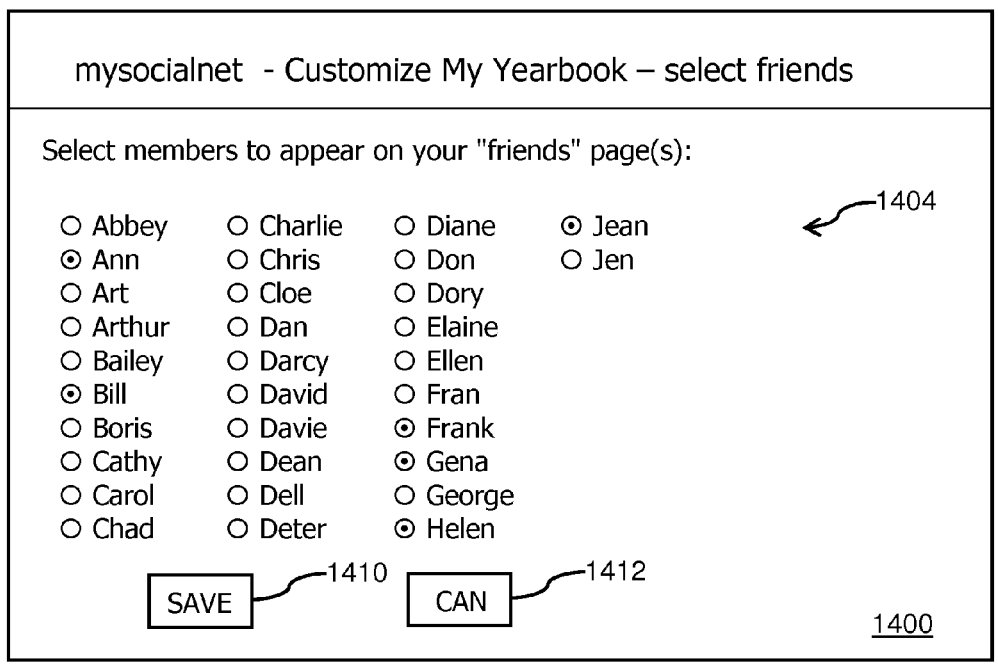

It is also anticipated that a user will want their friend page(s) to contain a specific set of friends, independent of who is in their buddy list. In such, a separate user interface 1400 such as that shown in FIG. 23 provides for selection of which members of the organization will appear on the user's friend page(s). In this exemplary interface 1400, one or more pages of members of the organization 1404 are presented and the user selects which members are to be placed on the user's friend page(s) (e.g., in this example, Ann, Bill, Frank, Gena, Helen, and Jean have been selected to be placed on the user's friend page). When finished selecting friends 1404, the user either selects "SAVE" 1410 to save the selections or "CAN" 1412 to cancel the selections.

Individual features shown in any of the examples presented work independently or in combination with any other feature shown and all combinations or isolated embodiments are anticipated and included here within.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for providing a customized digital yearbook, the system comprising:
   a server;
   a user device having an associated display, wherein media content is presented on the display of the user device;
   yearbook software running on the server receives yearbook data through a network and stores the yearbook data as unapproved content; and
   the yearbook software extracts approved yearbook data from the unapproved content and stores the approved yearbook data as approved content, the approved yearbook data being a subset of the yearbook data that is approved for distribution in the customized digital yearbook;
   the yearbook software merges the approved content with customized content pertaining to a particular user and external content, the external content including advertising, stores the advertising in digital form on the server, and delivers the customized content and the external content including the advertising into a customized digital yearbook for the particular user; and the customized digital yearbook is accessed by the user device of the particular user;
   wherein a fee is collected for each advertisement in the advertising, each of the fees being for presentation of a corresponding advertisement of each of the advertisements for a corresponding period of time and a new fee is collected for a new advertisement and after one of the corresponding periods of time, the yearbook software replaces the corresponding advertisement with the new advertisement in the customized digital yearbook accessed by the user device of the particular user.

2. The system of claim 1, wherein the yearbook software merges the approved yearbook data with external content when the customized digital yearbook is published.

3. The system of claim 1, wherein the yearbook software merges the approved yearbook data with updated external content after the customized digital yearbook is published.

4. The system of claim 1, wherein access to the customized digital yearbook is provided to the user device through a network connection.

5. The system of claim 1, wherein access to the customized digital yearbook is provided to the user device through social networking.

6. The system of claim 3, wherein the customized yearbook is provided to the user device on a physical storage medium and when the user device accesses the physical storage medium, the updated external content is accessed through a network connection.

7. A method for providing a customized digital yearbook comprising:
   collecting fees for an advertisement, the advertisement stored in digital form in a database; the fees being for inclusion of the advertisement in the customized digital yearbook for a corresponding period of time;
   capturing yearbook content for a yearbook into the database;
   editing and organizing the yearbook content within the database;
   determining approved yearbook content, the approved yearbook content being a subset of the yearbook content that is approved for distribution in the customized digital yearbook;
   creating a customized digital yearbook pertaining to a user, the customized digital yearbook comprising any or all of the approved yearbook content, and the advertisement; and accessing the customized digital yearbook pertaining to the user, including the advertisement, by user devices associated with the user;
   collecting new fees for a replacement advertisement, the replacement advertisement stored in digital form in the database; and after the period of time corresponding to the fees collected for the advertisement, replacing the advertisement in the customized digital yearbook with the replacement advertisement from the database and
   accessing the customized digital yearbook in which the replacement advertisement is included by the user devices whereby the replacement advertisement is presented.

8. The method of claim 7, wherein the step of accessing is performed through a social network.

9. The method of claim 7, wherein the step of accessing is performed through a network connection.

10. A method for providing a customized digital yearbook, the method performed by a computer having computer-executable instructions stored on non-transitory computer-readable media, the non-transitory computer-readable media interfaced to a computer, the computer executing the computer-executable instructions to implement the method comprising the steps of:
    capturing content for a yearbook;
    storing the content in a database; editing and organizing the content within the database, including extracting approved content from the content, the approved content being a subset of the content that is approved for distribution in the customized digital yearbook;
    storing an advertisement in the database for a prescribed period of time associated with the advertisement;
    producing a customized digital yearbook for a particular user, the customized digital yearbook including some or all of the approved content, and the advertisement; and delivering the customized digital yearbook to a device associated with the particular user;
    after the prescribed period of time associated with the advertisement, replacing the advertisement with a new advertisement in the database; and redelivering the customized digital yearbook to the device associated with the particular user, the customized digital yearbook including the new advertisement.

11. The method for providing a customized digital yearbook of claim 10, wherein the step of storing an advertisement in the database further includes a step of collecting a fee for inclusion of the advertisement in the customized digital yearbook for a period of time.

12. The method for providing a customized digital yearbook of claim 11, wherein the step of replacing the advertisement with the new advertisement further includes a step of collecting a second fee for inclusion of the new advertisement in the customized digital yearbook and the step of replacing the advertisement with the new advertisement is performed after the period of time elapses.

13. The method for providing a customized digital yearbook of claim 10, wherein the step of delivering the customized digital yearbook to the device associated with the particular user is performed over a network connection.

14. The method for providing a customized digital yearbook of claim 10, wherein the step of delivering the customized digital yearbook to the device associated with the particular user is performed through a social network.

15. The method for providing a customized digital yearbook of claim 10 wherein the step of delivering the customized digital yearbook to the device associated with the particular user includes copying the customized digital yearbook onto a digital medium and accessing the digital medium by the device associated with the particular user, and responsive to the step of replacing the advertisement with a new advertisement in the database, retrieving the new advertisement through a network and redelivering-the customized digital yearbook including the new advertisement to the device associated with the particular user.

* * * * *